Figure 1:
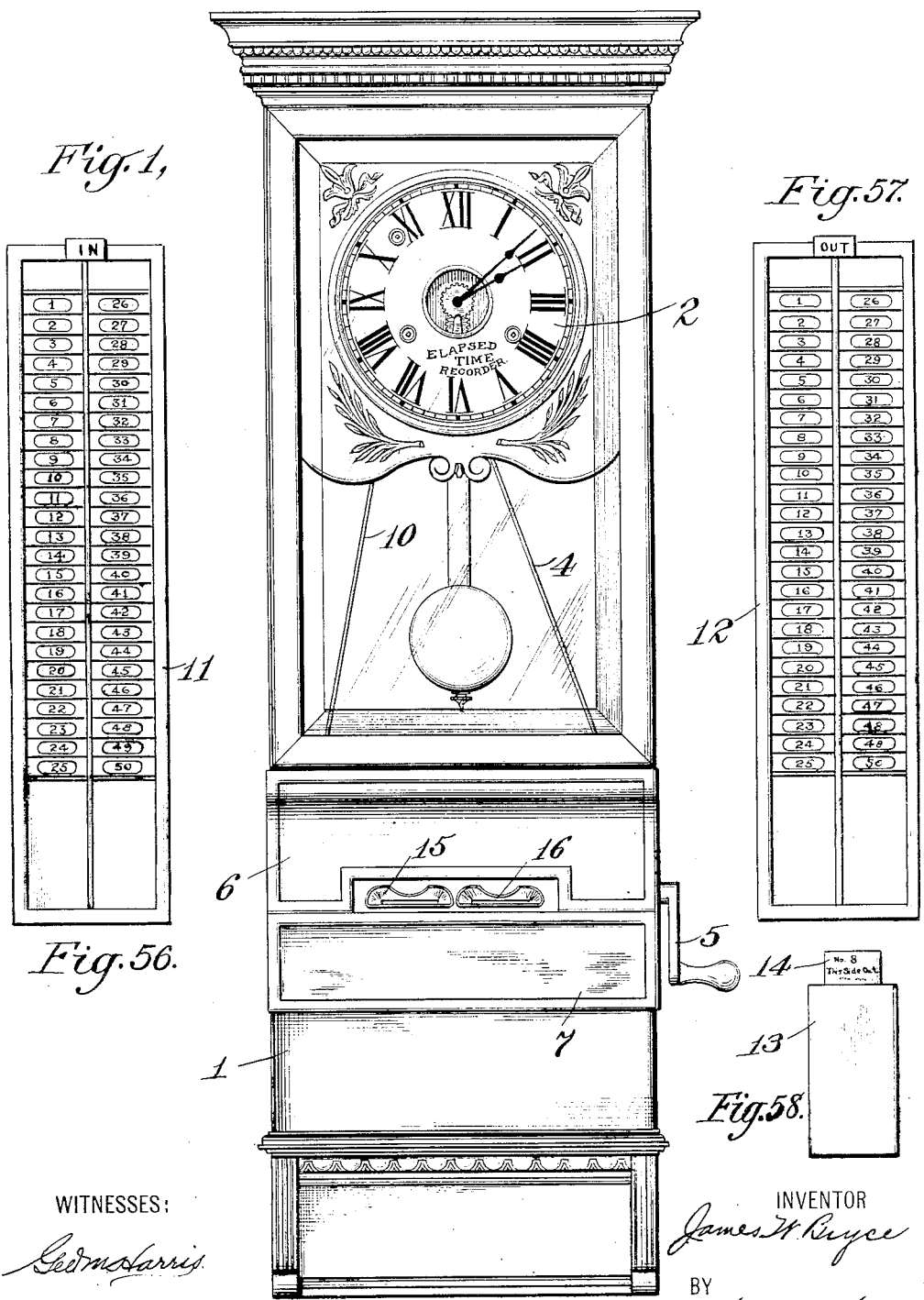

J. W. BRYCE.
RECORDER.
APPLICATION FILED JAN. 18, 1907.

1,205,082.

Patented Nov. 14, 1916.
20 SHEETS—SHEET 3.

WITNESSES:
Geo. M. Harris.
M. O. Guy.

INVENTOR
James W. Bryce
BY
Kenyon & Kenyon,
his ATTORNEYS

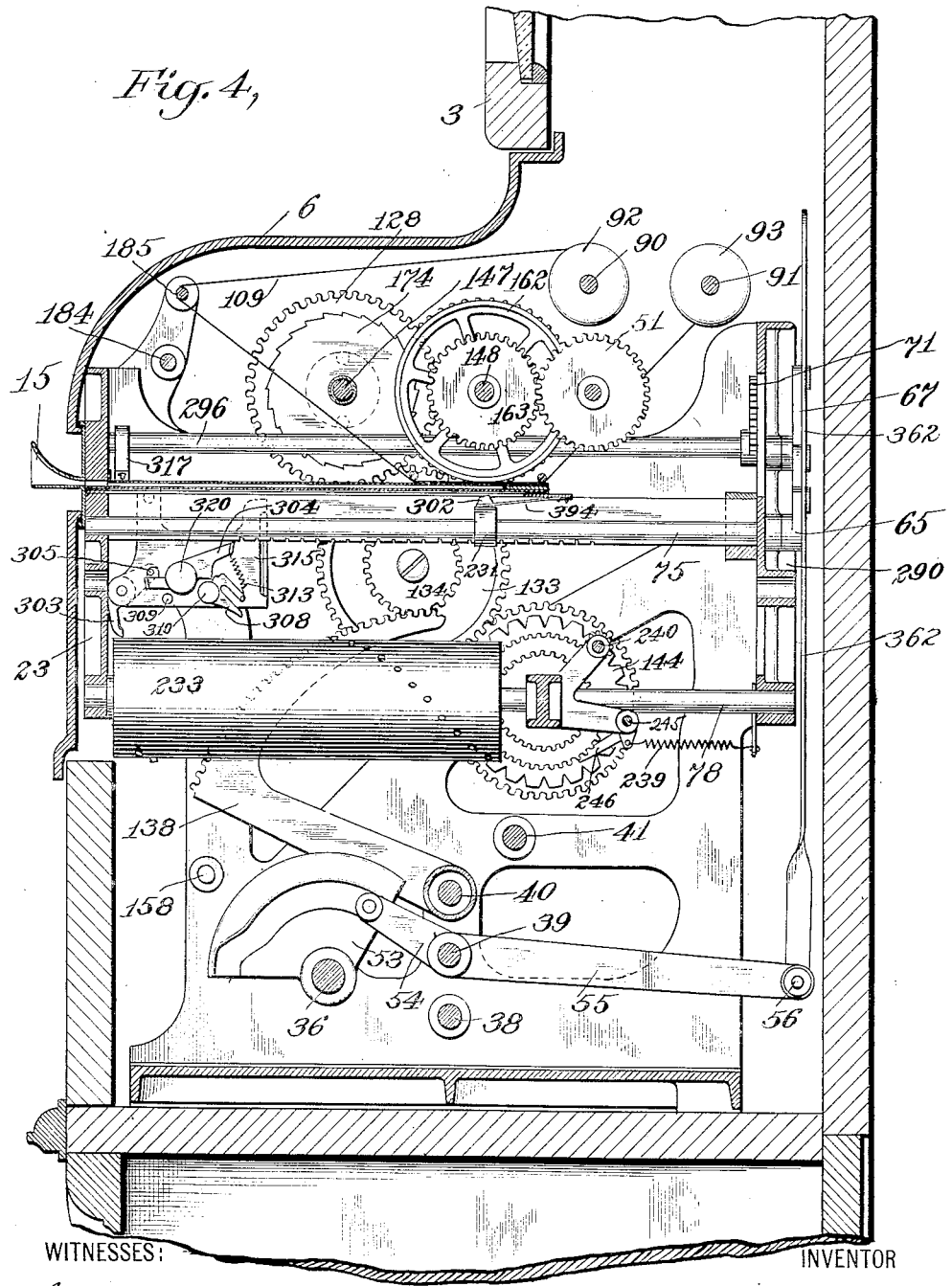

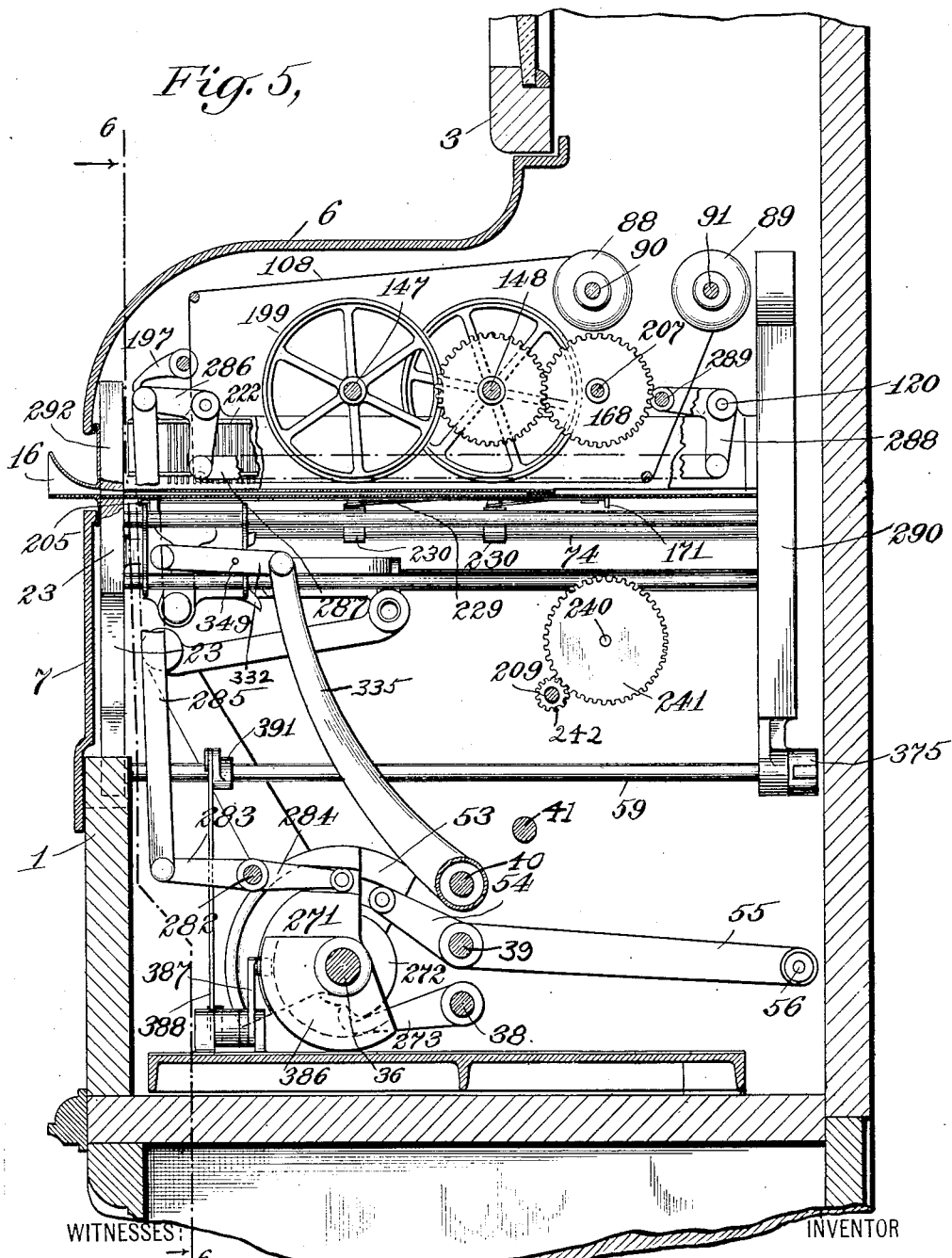

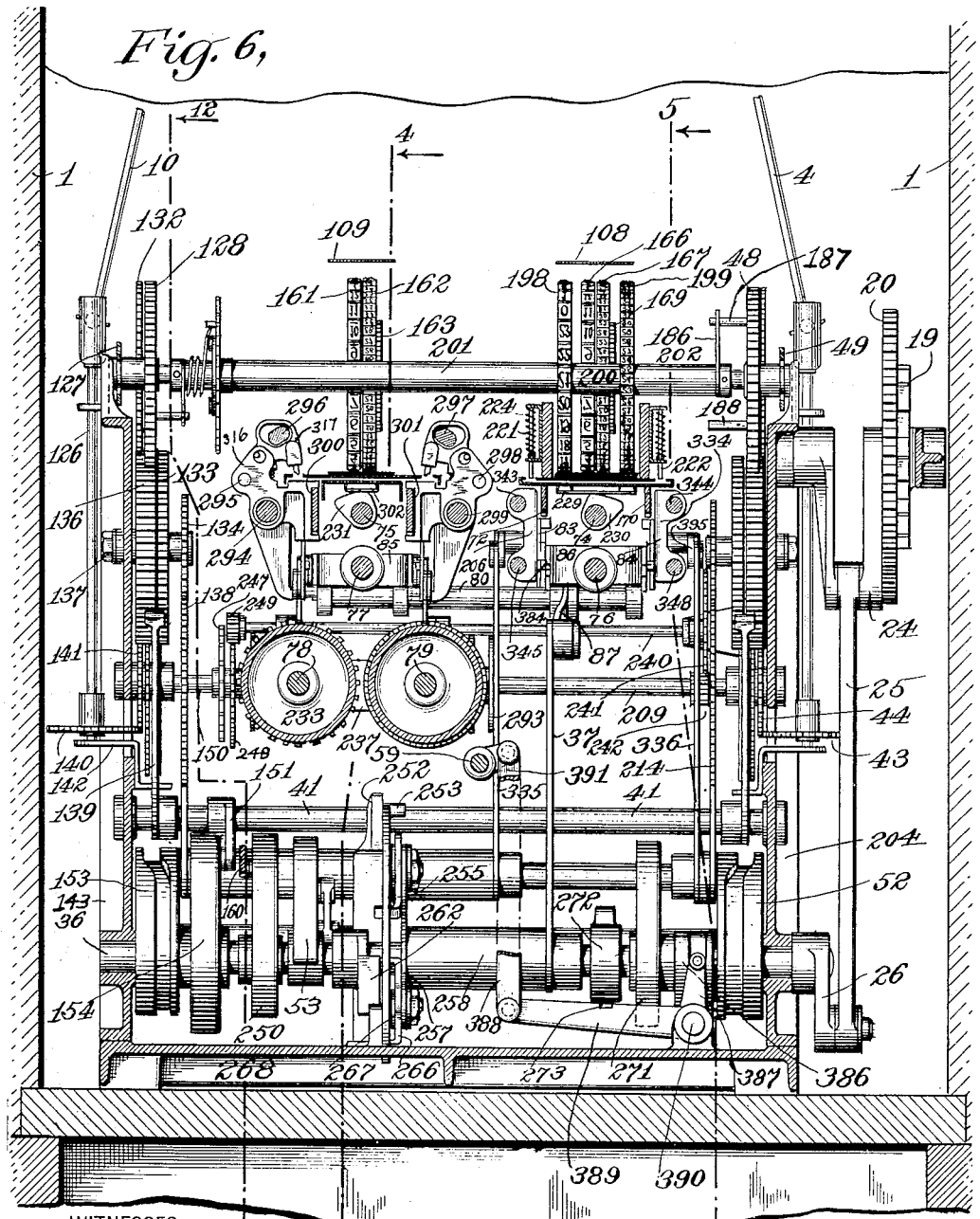

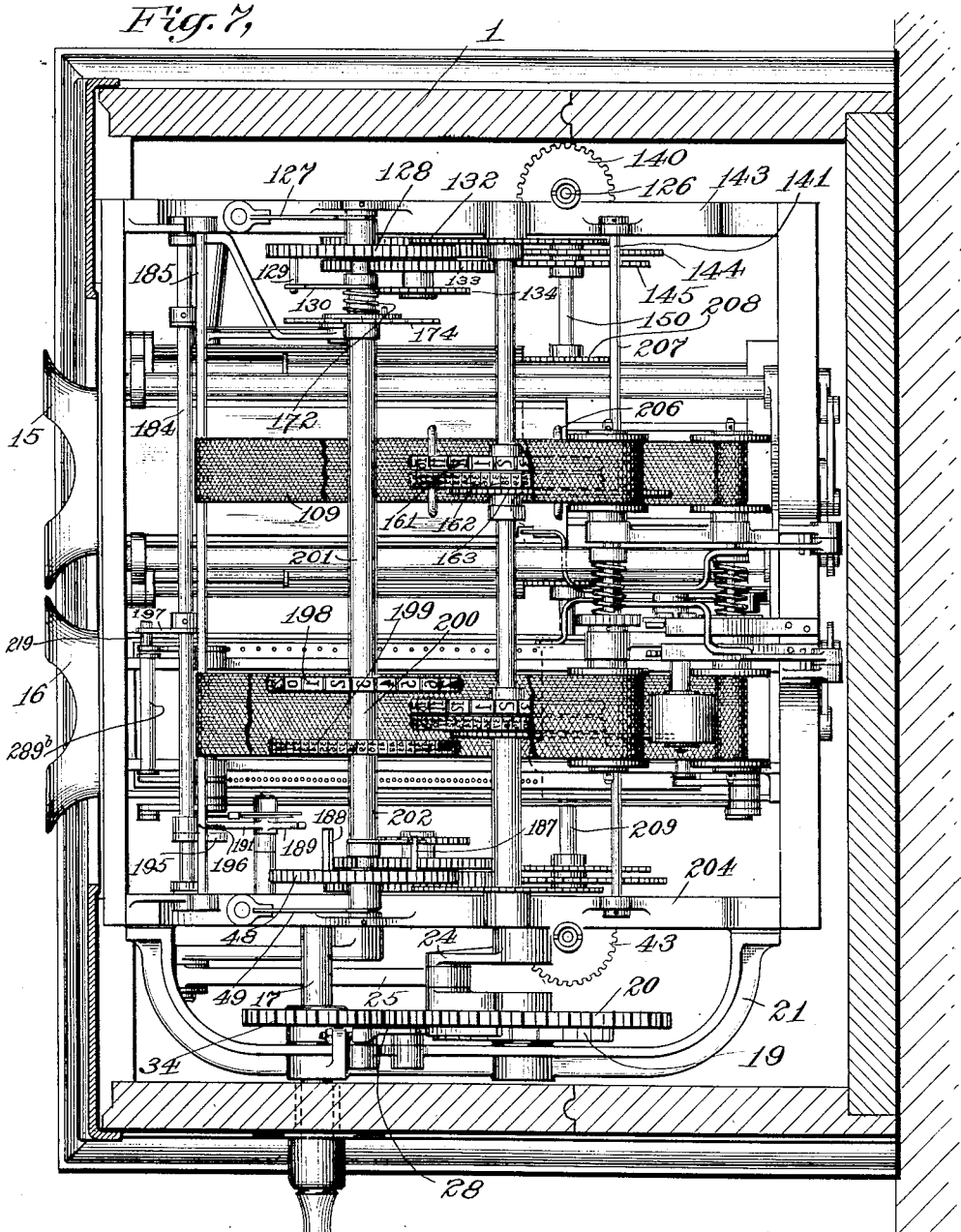

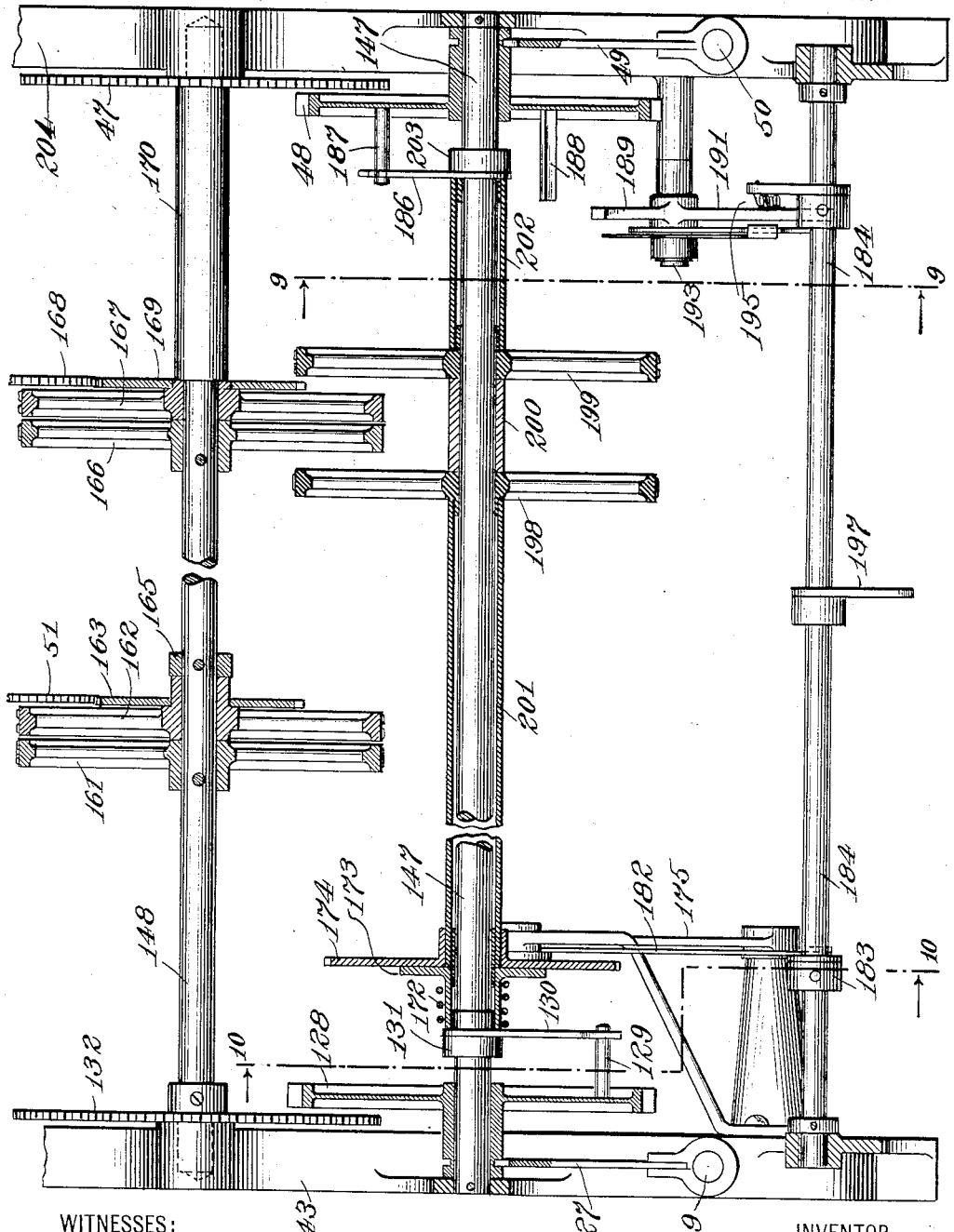

J. W. BRYCE.
RECORDER.
APPLICATION FILED JAN. 18, 1907.
1,205,082.
Patented Nov. 14, 1916.
20 SHEETS—SHEET 9.
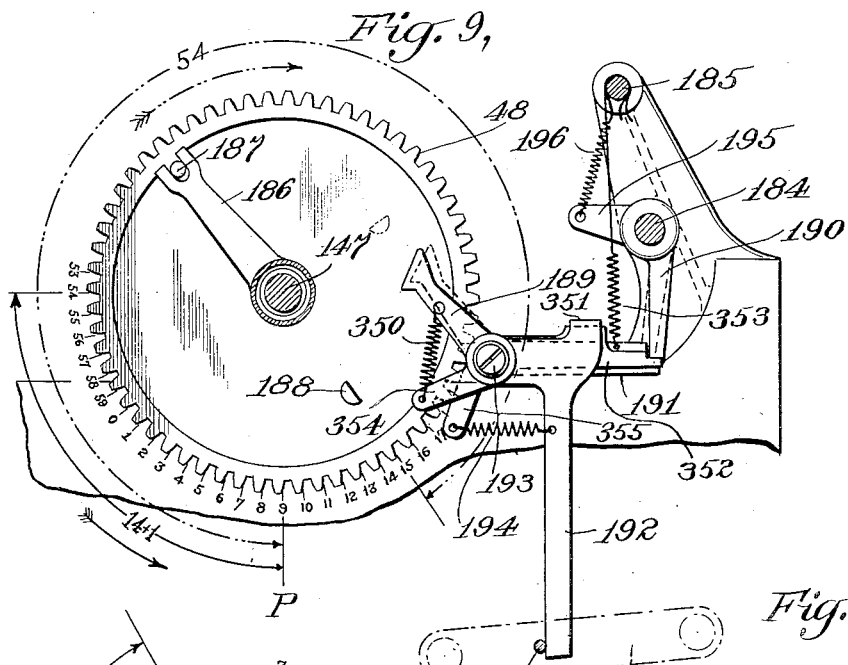
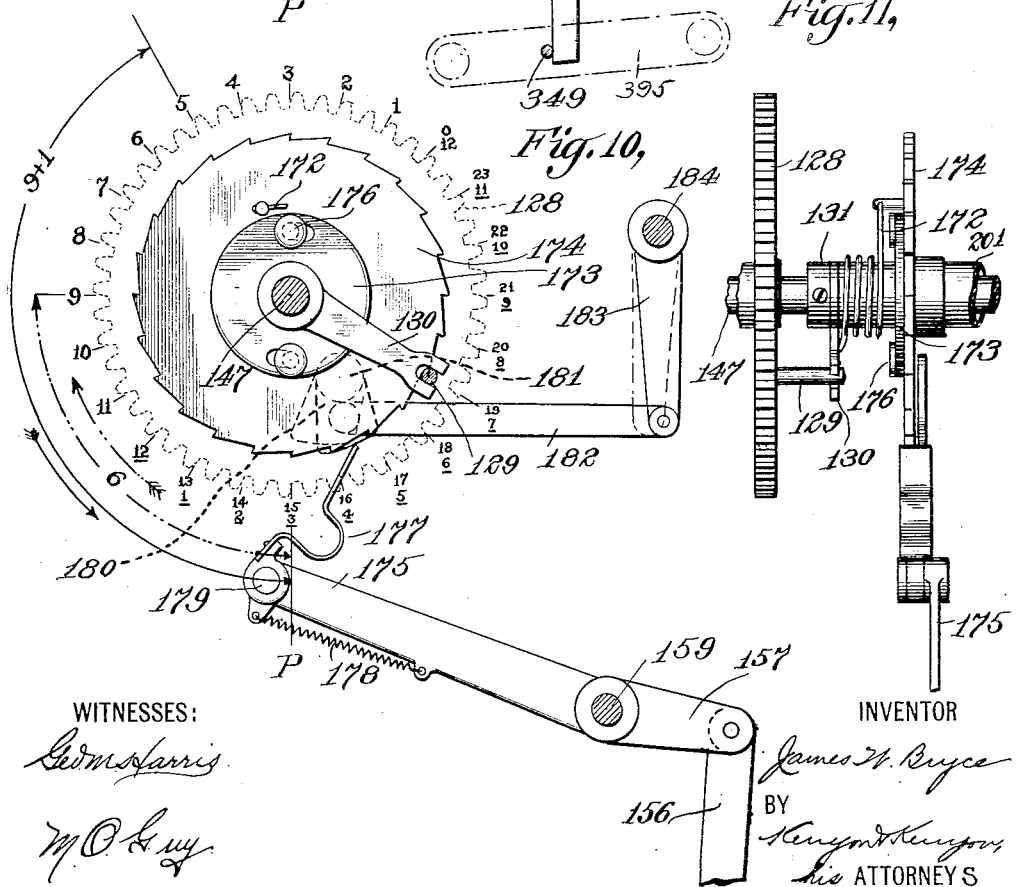
WITNESSES:
INVENTOR
James W. Bryce
BY
Kenyon & Kenyon
his ATTORNEYS

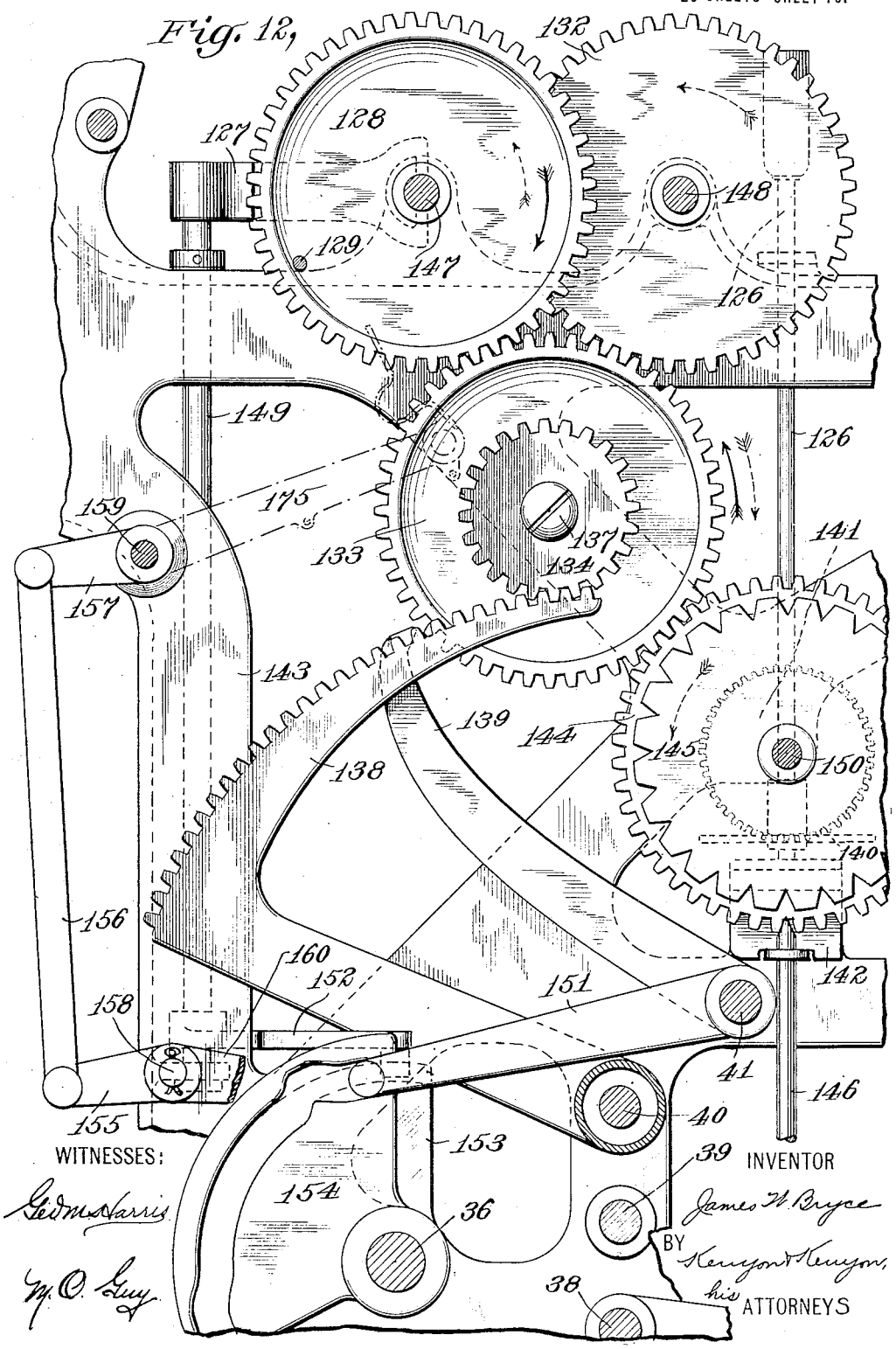

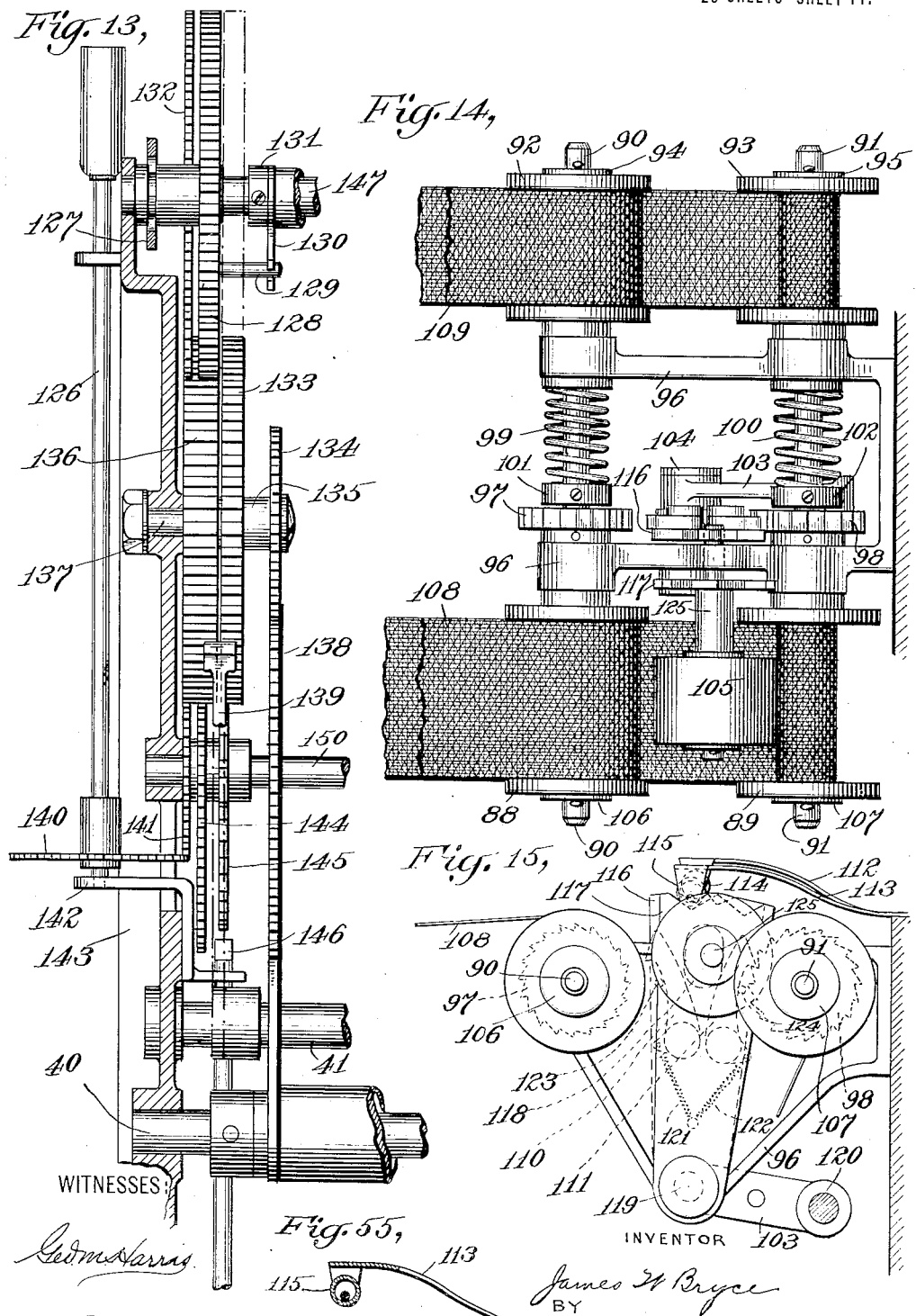

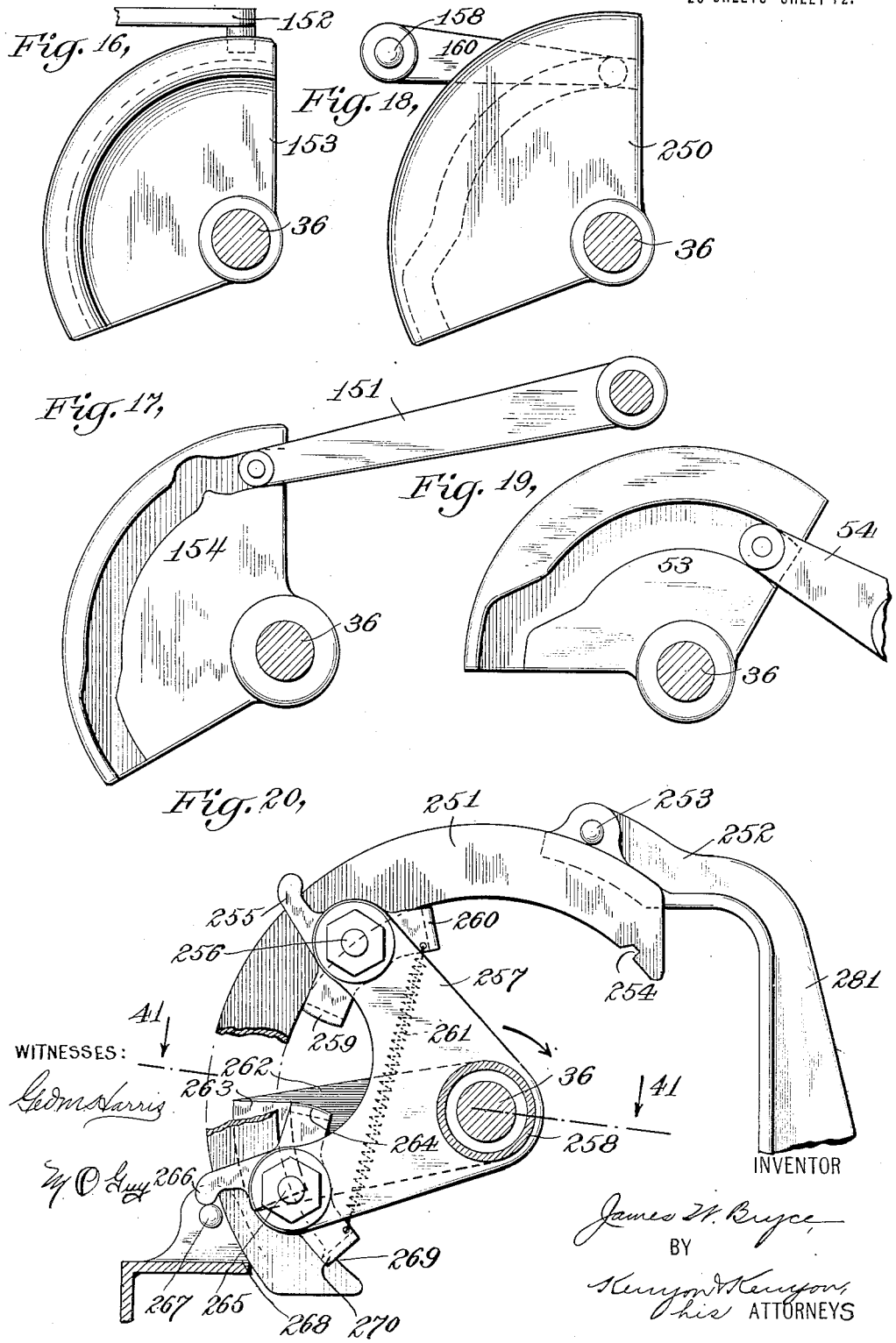

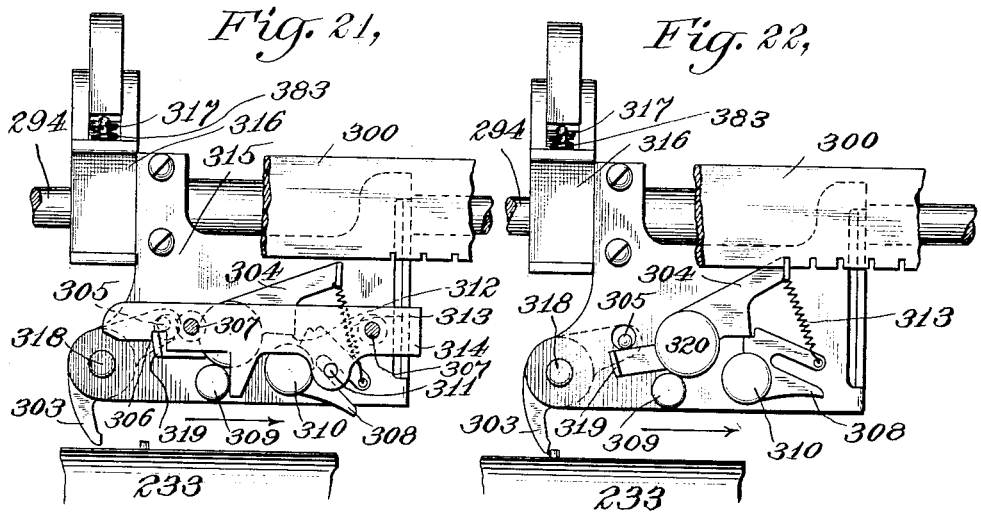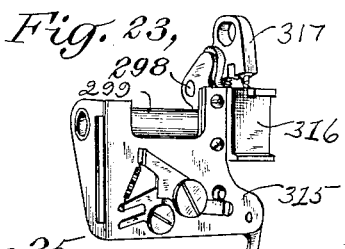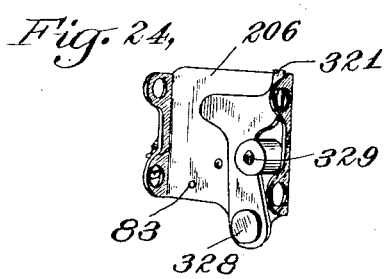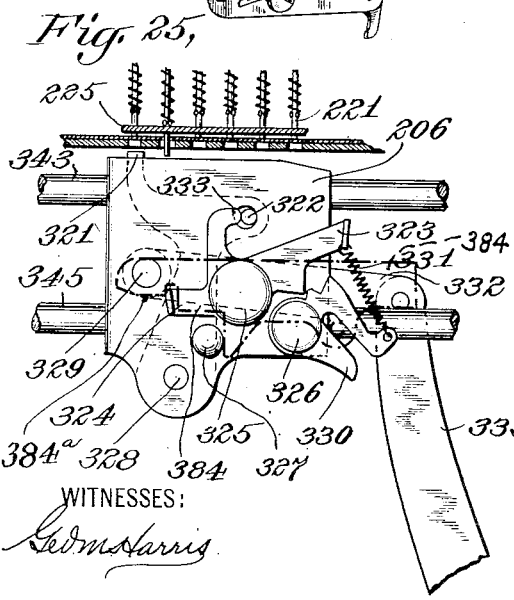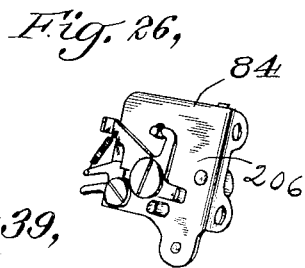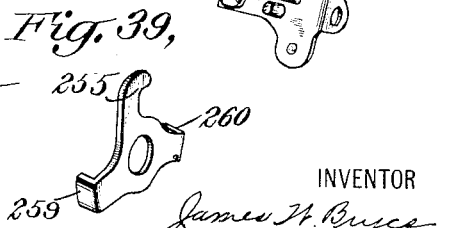

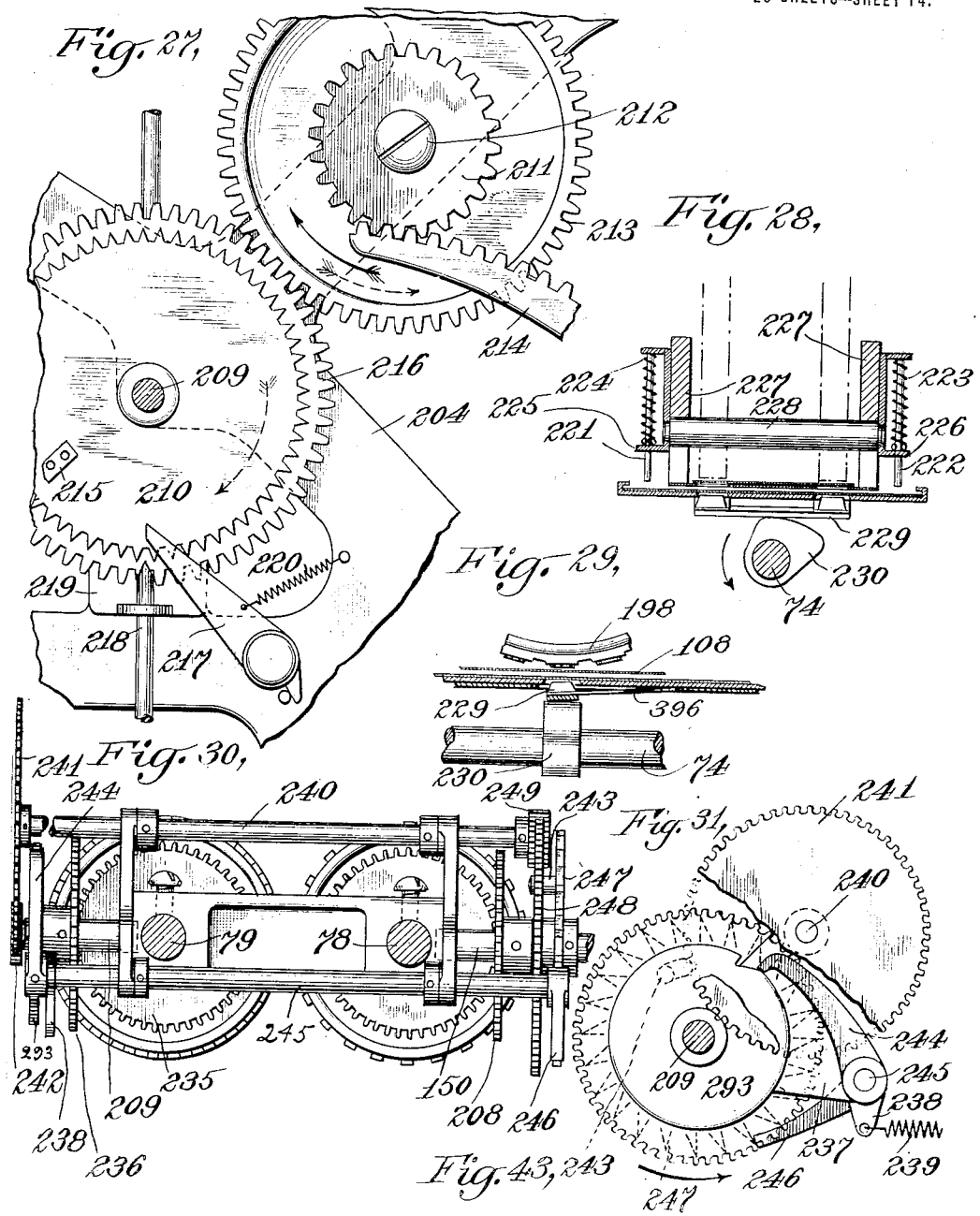

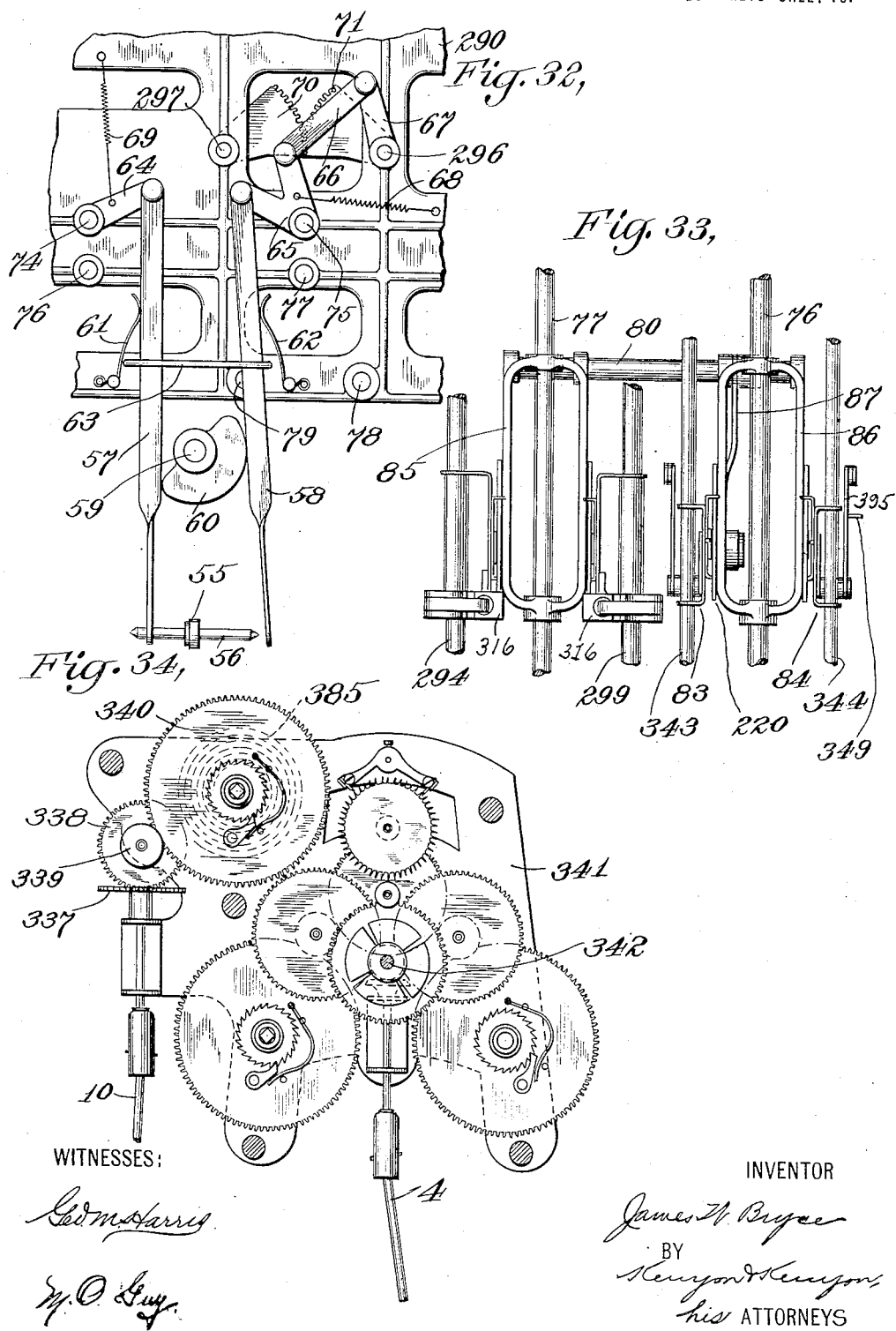

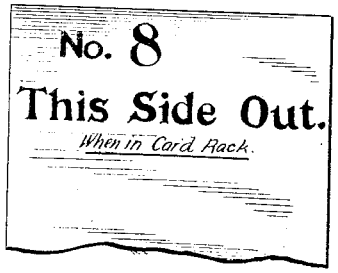

J. W. BRYCE.
RECORDER.
APPLICATION FILED JAN. 18, 1907.
1,205,082.
Patented Nov. 14, 1916.
20 SHEETS—SHEET 17.
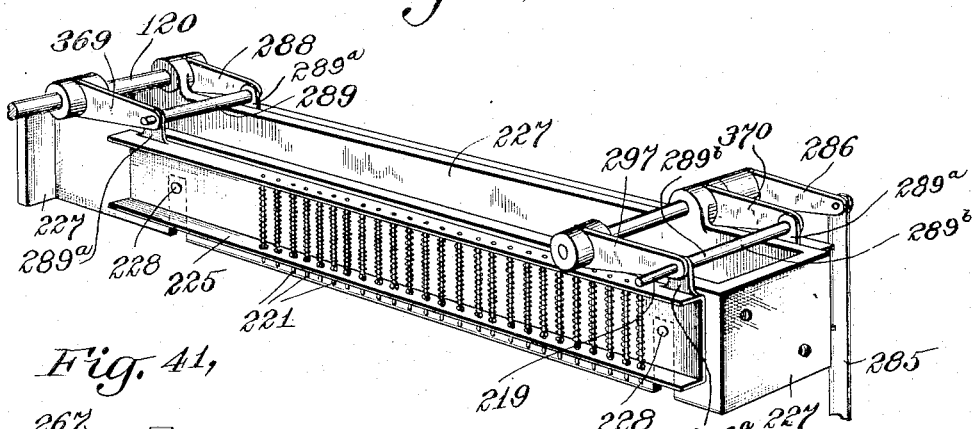
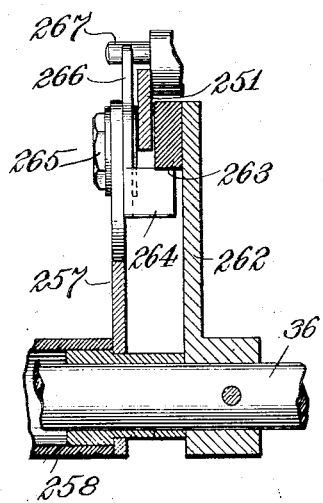
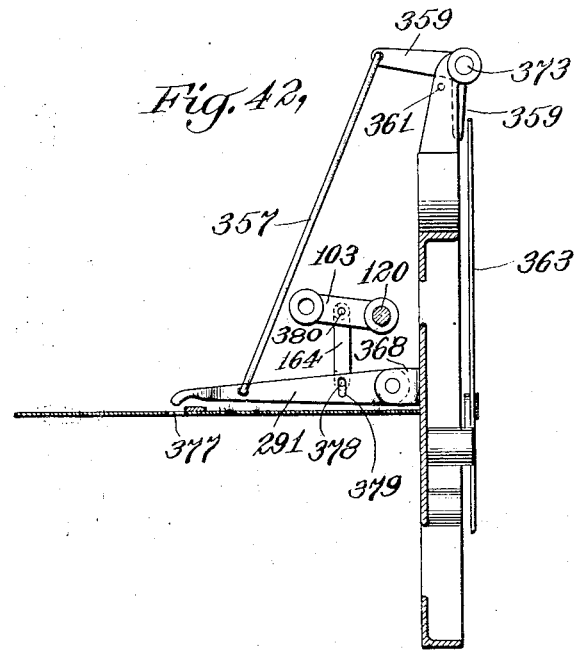
WITNESSES:
INVENTOR
James W. Bryce
BY
Kenyon & Kenyon,
his ATTORNEYS

J. W. BRYCE.
RECORDER.
APPLICATION FILED JAN. 18, 1907.

1,205,082.

Patented Nov. 14, 1916.
20 SHEETS—SHEET 18.

WITNESSES:
Geo. M. Harris
M. O. Guy.

INVENTOR
James W. Bryce
BY
Kenyon & Kenyon,
his ATTORNEYS

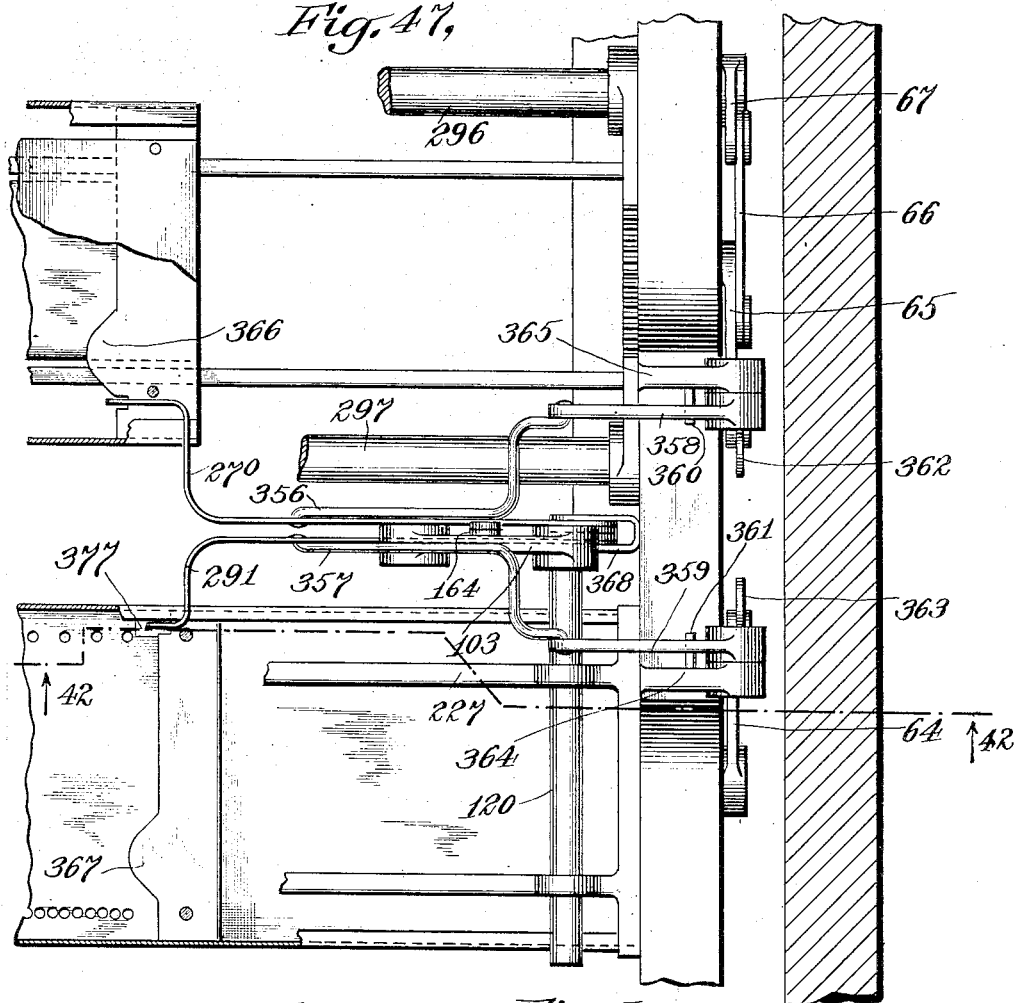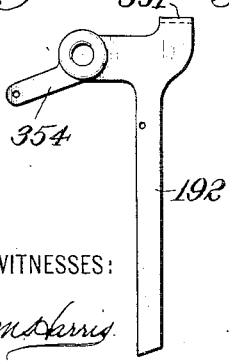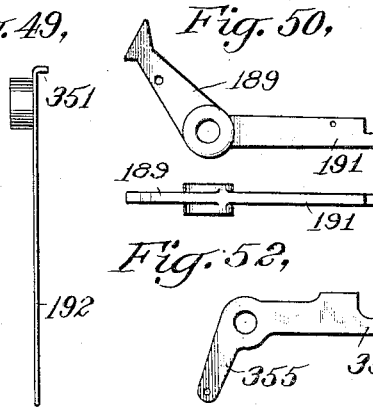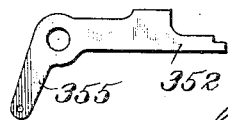

UNITED STATES PATENT OFFICE.

JAMES W. BRYCE, OF BROOKLYN, NEW YORK, ASSIGNOR, BY MESNE ASSIGNMENTS, TO THE INTERNATIONAL TIME RECORDING COMPANY OF NEW YORK, A CORPORATION OF NEW YORK.

RECORDER.

1,205,082.   Specification of Letters Patent.   Patented Nov. 14, 1916.

Application filed January 18, 1907. Serial No. 352,859.

*To all whom it may concern:*

Be it known that I, JAMES W. BRYCE, a citizen of the United States, and a resident of Brooklyn, in the county of Kings and State of New York, have invented certain new and useful Improvements in Recorders, of which the following is a specification.

My invention relates to recorders. It is of special value in connection with recorders for indicating elapsed times, as for example, the elapsed time between the starting of work and the stopping of work on a job. It is, however, not limited to time recorders or to indicating differences in time, it being possible to use my improvement for indicating other differences, as for example, differences in money values.

My invention has for its object to improve the indicating mechanism of such machines; to print or otherwise indicate the time or other data of the first or "in" operation of the machine, and also the time or other data in reference to the second or "out" operation; also where the indicating mechanism indicates elapsed time, to provide means whereby the indicating mechanism may normally be driven by a clock movement to indicate normally the true time, but may be disconnected therefrom, and connected with some other driving power to effect the elapsed time indicating operation; also to affect the extent of operation of such indicating mechanism by marks and by devices controlled by such marks; also to so arrange the devices for making the marks and the means for indicating the data of the "in" and "out" operations, so that one or more of such devices shall at any desired time be operative, and the others inoperative; also to provide common operating means for such devices and means for operatively connecting one or more of such devices with such operating means, and disconnecting the other from such operating means; also to provide a suitable carriage for operating the marking devices and the devices controlled by the marks made thereby, and means for causing the carriage to operate one or the other or both of such devices; also to insure against the operation of such machines to give their appropriate indications, except when a proper card has been inserted and properly inserted; also to guard against the operation of the indicating mechanism on the second operation of the machine when an unmarked or unpunctured card is inserted; also generally to improve, simplify and make more accurate and reliable the subtracting mechanism, the marking devices, the devices controlled by the marks made thereby, indicating mechanism and many other parts of elapsed time indicating machines and machines for indicating differences between two operations of the same.

My invention consists in the novel devices herein shown and described.

My invention is illustrated in the drawings accompanying this specification, and forming a part hereof, in connection with a machine for indicating elapsed time between the starting and finishing of a job, although of course it is not limited to use in such a machine. The form of indication made in the particular machine shown in the drawings is that of printing the elapsed time in hours and minutes on a card inserted by the operator in suitable receptacles in the machine, and also printing the time of the first or "in" operation of the machine and also the time of the second or "out" time operation of the machine. Any suitable method or form of indication, however, may be employed, as for example, visual signal or display.

I will now proceed to describe the particular embodiment of my invention contained in the machine shown in the drawings.

Figure 2:
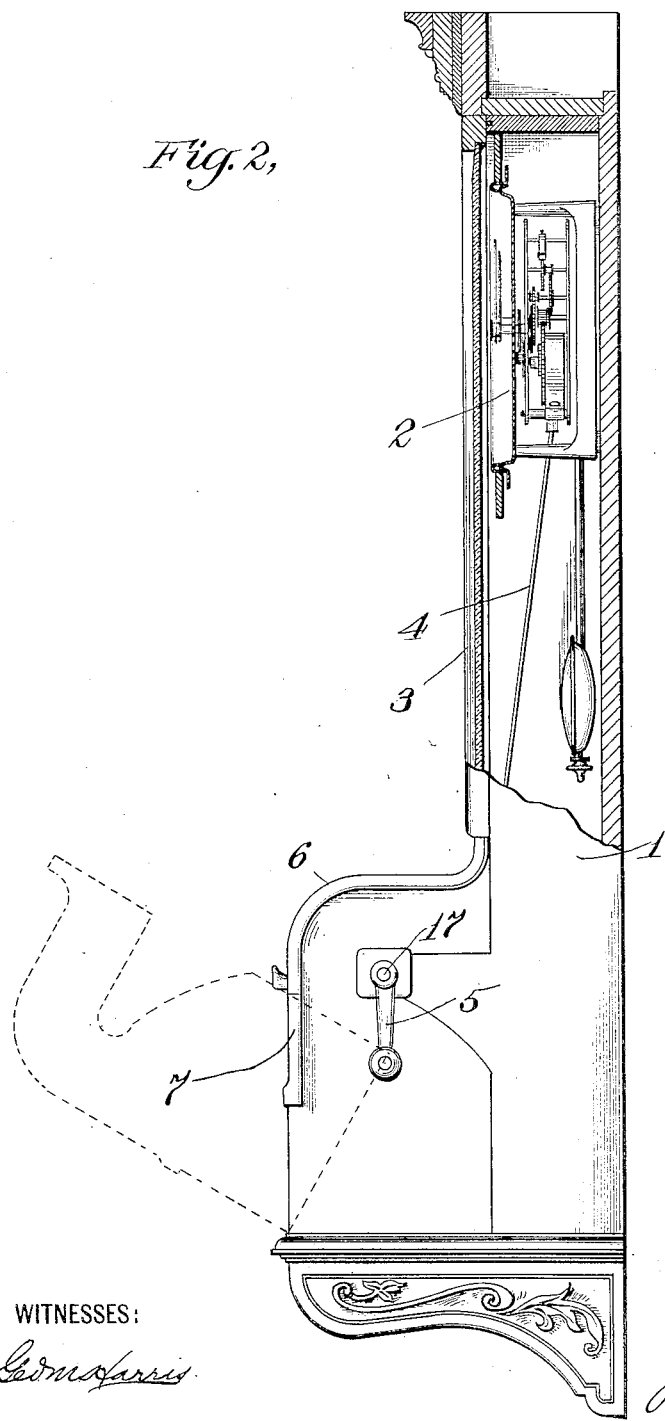
Figure 3:
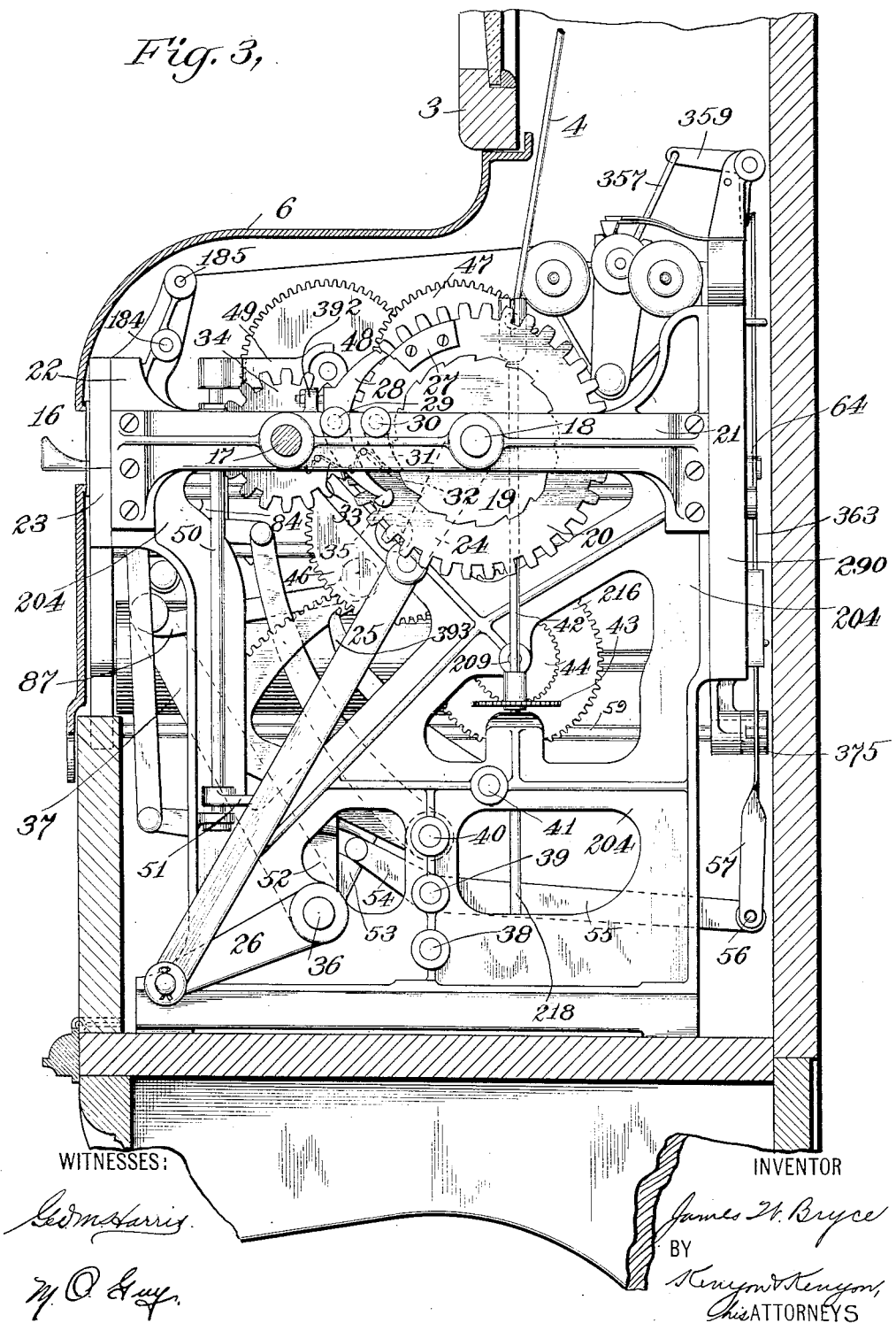
Figure 44:
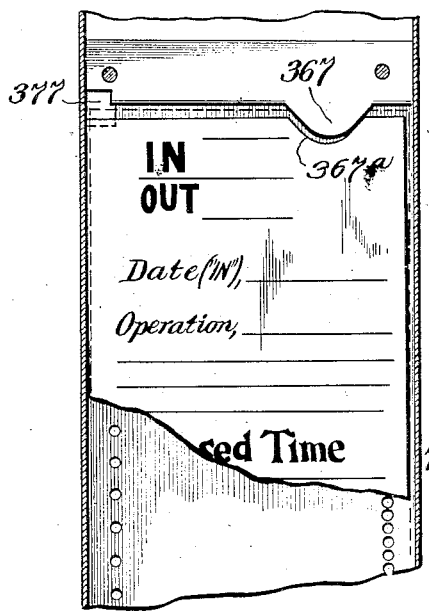
Figure 45:
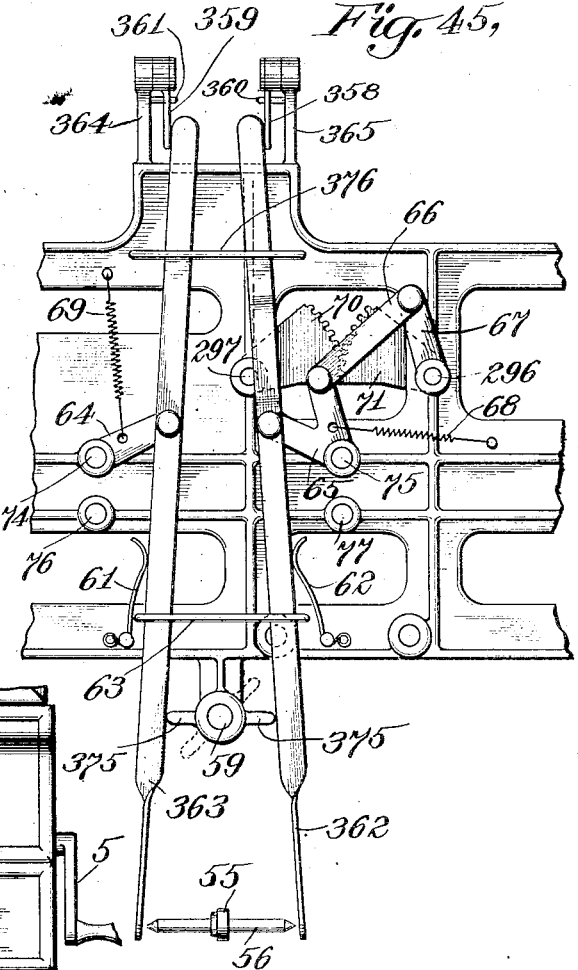
Figure 46:
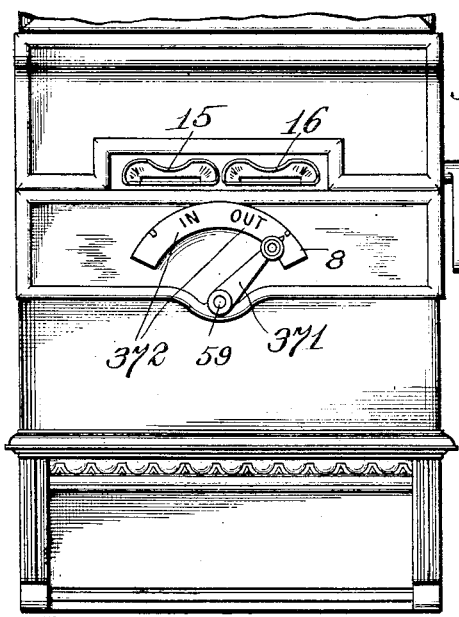
Figure 53:
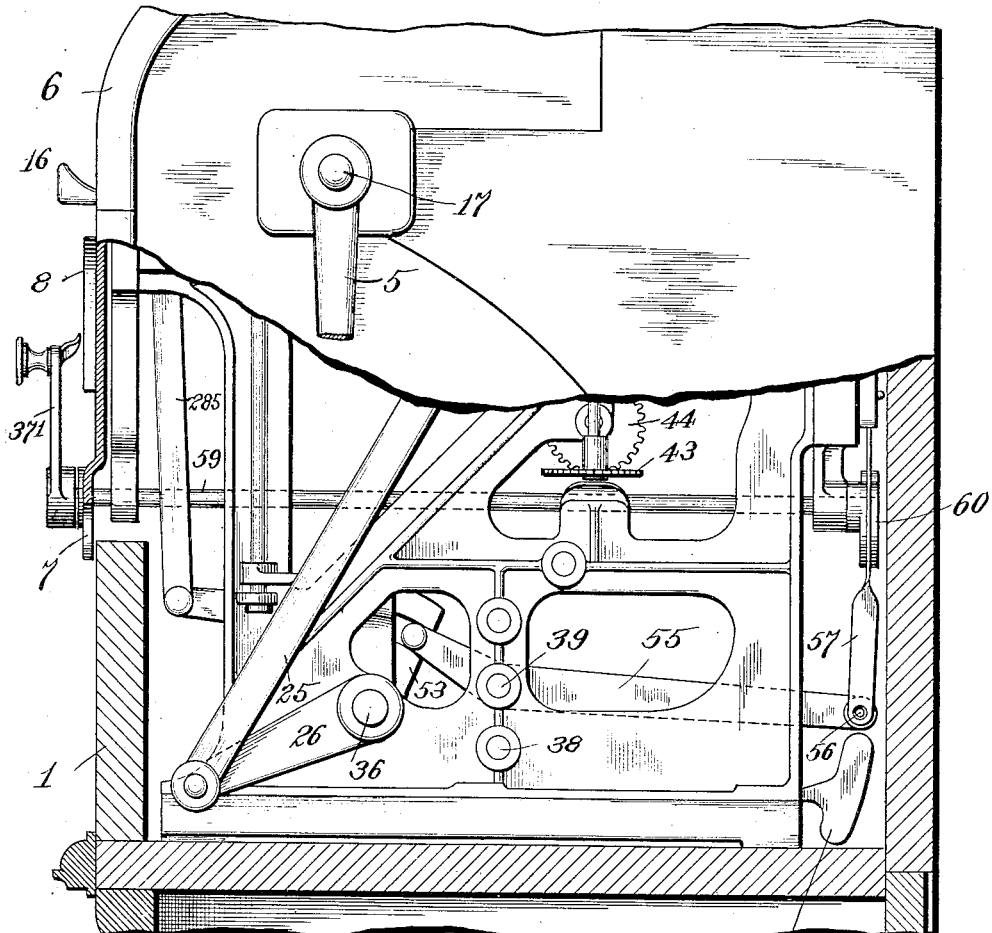
Figure 54:
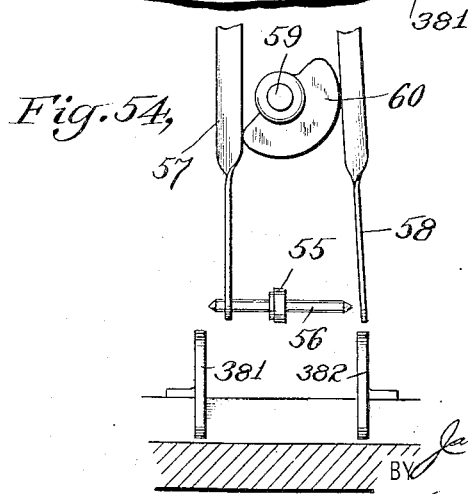

Of these drawings, Figure 1 is a front view of my improved device as embodied in a machine for printing elapsed times. Fig. 2 is a side view of said machine, partly in section. Fig. 3 is a vertical side view with the case in section, showing a complete side view of the recording mechanism. Fig. 4 is a vertical section through the "in" slot, taken on lines 4—4 of Fig. 6. Fig. 5 is a vertical section on lines 5—5 of Fig. 6, taken through the "out" slot. This view shows the pin box in side view broken away, the levers, link and cam for raising and lowering the same and the elapsed time and finishing time type wheels, together with their ink ribbon and pressure printing pads. Fig. 6 is a vertical cross-section on lines 6—6 of Fig. 5. This view shows the main shaft, with all the operating cams in position, a side view of the impulse and edge view of the punchers and type wheels and an edge view of the sliding gears. The main operating crank, the subtractor ratchet, the clock drive and the hour drop off or transfer mechanism are also shown. Fig. 7 is a top view of the recording mechanism with the case in section. Fig. 8 is a top view of the type wheels and the mechanism which actually performs the subtraction of one unit from the hour wheel. Fig. 9 is a section on lines 9—9 of Fig. 8, and shows the trip device of the subtractor mechanism. Fig. 10 is a sectional view on lines 10—10 of Fig. 8 showing the subtractor mechanism. Fig. 11 is an edge view of the mechanism shown in Fig. 10. Fig. 12 is a sectional view showing the inside face of the left hand or hour side frame, taken on the lines 12—12 of Fig. 6, and shows the complete gearing for moving the hour type wheels. Fig. 13 is an edge view of the said gearing. Fig. 14 is a detailed top view of the ink ribbon mechanism and Fig. 15 is a side view of the same. Figs. 16–19 inclusive are detailed views of different actuating cams, Fig. 16 showing the cam for shifting and sliding the hour gear, Fig. 17 showing the alining cam, Fig. 18 the subtractor cam and Fig. 19 the printing and punching cam. Fig. 20 is a side view of the impulse mechanism. Figs. 21 and 22 are front views of the hour punch and connecting mechanism, Fig. 21 showing the punch locked to the carriage and Fig. 22 showing it unlocked. Fig. 23 is a perspective view of the minute punch. Fig. 24 is a perspective view of the back of the hour selector block. Fig. 25 is a face view of the same showing it about to engage a pin. Fig. 26 is a perspective view of the face of the minute selector block. Fig. 27 is an inside view of some of the gears on the right-hand side frame (the minute frame). Fig. 28 is a cross-section of the pin box and a pressure printing pad. Fig. 29 is a detailed side view of the pressure printing pad shown in Fig. 28. Fig. 30 is a side view of the hour transfer mechanism, with full sized end view of the pin cylinders. Fig. 31 is a detailed side view of the hour transfer gearing. Fig. 32 is a back view of part of the "in" and "out" transfer mechanism or the means for throwing one or the other into operative connection or out of operative connection with the driving means. As shown in the figure, the transfer mechanism is manually operated. Fig. 33 is a top view of the carriage with the punches and selectors in their proper relative positions when locked to the carriage. Fig. 34 is a front view of the gearing of the clock movement. Figs. 35–37 inclusive are face views of the card showing the detent used for alinement, etc. Fig. 38 is a back view of the top of the card. Fig. 39 (Sheet 13) is a detail of one of the impulse locks. Fig. 40 is a perspective view of pin box and actuating levers. Fig. 41 is a detailed section of the impulse locks and connecting parts on the lines 41—41 of Fig. 20. Fig. 42 is a detailed side view of the devices for preventing the operation of the printing or other devices when no card is inserted or a card is improperly inserted in a machine, and is a vertical section taken on the lines 42—42 of Fig. 47. Fig. 43 (see Sheet 14) is an enlarged detailed perspective view of a selecting pin. Fig. 44 is a plan view of the "out" slot, showing a card being alined in the slot. Fig. 45 is a rear view of the "in" and "out" transfer mechanism when automatically actuated. Fig. 46 is a partial front view of the lower part of my improved time recorder when provided with manual means for operating the "in" and "out" transfer mechanism. Fig. 47 is a plan view of the means for automatically operating the "in" and "out" transfer mechanism, and the means for preventing actuation of the printing and other devices when no card is inserted or a card is improperly inserted in the machine. Figs. 48–52 are details of some of the parts of the subtractor mechanism. Fig. 53 is a side view of a portion of the recorder broken away to show more clearly the devices for manual operation of the "in" and "out" transfer mechanism. Fig. 54 is a detail of part of such mechanism. Fig. 55 (see Sheet 11) is a detailed view of the spring or roller mounting for the ink ribbon mechanism. Fig. 56 shows an "in" rack and Fig. 57 an "out" rack for holding the cards and Fig. 58 is a view of a single compartment of one of the racks containing a card in position.

Before proceeding to describe in detail the machine shown in the drawings, I will in a general way briefly describe its operation. When an operator starts a job, he removes his particular card, bearing the number assigned to him from the "out" rack shown in Fig. 57. Such a card is illustrated in Fig. 35. He then inserts his card into the "in" slot 15 of the machine, pushing it in as far as it will go. He then gives two complete turns to handle 5. This prints upon the card the "in" time, and also punches two holes in the card, whose location and arrangement on the card represent the same starting time. These holes are spoken of herein as starting time marks, and are illustrated on the card of Fig. 36 as the holes marked 346 and 347, one representing the hour and the other the minute of the time when the punching operation took place. The "in" time, as printed on the card shown in Fig. 36, is shown as 8:14, which of course represents 8:14 a. m. The operator then removes his card from slot 15, and places it in its appropriate compartment in the "in" rack shown in Fig. 56.

At the conclusion of the job he takes his card out of the "in" rack, and inserts it into the "out" slot 16, pushing it in as far as it will go, and then gives handle 5 two complete revolutions. This prints upon the card the time of this "out" operation, and also prints the time that has elapsed between the "in" operation and the "out" operation. The card shown in Fig. 37 illustrates the "out" time as thus printed as 2:08, meaning 2:08 p. m., and the elapsed time as five hours and fifty-four minutes. The entire operation of the machine is automatic, except the mere insertions of the card by the workman and the turning of handle 5.

In the above described form of my improvement, the printing devices for printing the "in" time and the punching devices are made operative or inoperative, and the printing devices for printing the "out" time and the elapsed time are made operative or inoperative automatically. If desired, however, this may be accomplished manually by the operator, as for example, through the agency of an "in" and "out" lever 371 shown in Fig. 46 of the drawings. Where such a device is employed, the operator throws the lever 371 to the "in" position when he operates the machine at the beginning of a job, and throws the lever to the "out" position when he operates it at the close of a job. The effect of throwing the lever to the one or the other of these two positions is to make operative either the "in" printing devices and the punching devices or the "out" and elapsed time printing devices, as the case may be.

The card is preferably provided with means for insuring that the machine will not be operative unless a proper card is inserted in the slot, and is inserted the proper distance, and in the right way. As shown in the drawings, the card is provided for this purpose with a detent 367ª near its upper or inner right hand edge. When the card is inserted into the slot, this detent coöperates with a corresponding projection 367 from the rear of the slot, the projection taking into the detent when the card is inserted the full distance, and right side up. The projection and detent also serve the purpose of alining the card. Unless the card is inserted the full distance, and with the proper side up, the punching and printing devices do not operate.

Referring a little more in detail to the operation of the device, the insertion by the workman of a card into the "in" slot in the proper manner and the turning of handle 5 two revolutions cause the various parts of the machine to be operated. Among other things, it causes a carriage composed of the two frames 85 and 86 (shown in Figs. 6 and 33) connected by a cross-rod 80, to move along rods 76 and 77 a certain prescribed distance, and after an interval of rest to return to its original position. The movement of this carriage during the "in" operation of the machine serves to carry the hour and minute punches over the card a distance dependent on the time of the "in" operation, and to bring them over a point in the card representing the hour and minute of such operation, and during the "out" operation of the machine it serves to move the selecting devices over the card until they are stopped by means of the time marks or holes, previously punched in the card, and devices coöperating therewith, this latter movement moving the elapsed time type wheels 198 and 199 to a position representing the time that has elapsed between the "in" and "out" operations of the machine. Suitable means actuated through the revolution of handle 5 serve at the proper time to depress the punches, which causes them to punch time marks in the card, one representing the minute and the other the hour of the time of the "in" operation of the machine, and suitable devices, also actuated through handle 5, serve to print the various times upon the card above described.

In my improvement, as shown in the drawings, the elapsed time indicating mechanism, namely, type wheels 198 and 199, are normally connected with and driven by the clock mechanism. They then serve normally to indicate the true time. About the beginning of the "out" operation of the machine, however, these type wheels are temporarily disconnected from the clock mechanism, and are connected with gearing driven through the revolution of handle 5, and are controlled in that movement by the selecting devices. This operation causes the elapsed time type wheels to move backward, and to move the distance represented by the travel of the selecting devices from their initial or zero position to a position represented by the starting or "in" time. At the end of this movement, the selecting devices are disconnected from the carriage mechanism and cease to turn the elapsed time type wheels, through the medium of the marks or holes in the card representing the hour and minute of the "in" operation of the machine. At this time the elapsed time type wheels will have brought upon the printing line type representing the elapsed time between the two operations of the machine. It will be seen that by this operation the time of the "in" operation has been subtracted from the time of the "out" operation, the position of the elapsed time type wheels indicating the true difference between such times, or in other words, the true elapsed time.

In Fig. 6 are shown the "in" time type wheels 161 and 162, and also the "out" time type wheels 166 and 167.

I will now proceed to describe in detail the machine shown in the drawings.

1 represents the inclosing casing of my improved machine, shown in the drawings; 2 the clock movement; 3 the front casing; 6 the curved front casing at the top of the part inclosing the recording mechanism; 7 the front curved panel. The part 6 of the front casing is preferably made so as to swing outright, as shown in Fig. 2, in order that easy access may be had to the interior of the mechanism.

11 represents the "in" rack shown in Fig. 56, and 12 the "out" rack.

13 represents a single compartment of one of the racks, with card 14 in position. Preferably on the back of the card the workman's number is printed, with suitable words to indicate the side of the card to be kept out while in the rack, as shown in Figs. 58 and 38.

Any suitable medium for receiving time marks, through or by means of which selecting devices may be actuated, or any suitable devices capable of similarly effecting or actuating selecting devices, may be used. I have shown, and I prefer to use for this purpose a card, such as is shown for example, in Figs. 35–37, Fig. 35 showing the card before use, Fig. 36 after it has been inserted in the "in" slot, and Fig. 37 after it has been also inserted in the "out" slot.

I will first describe the main driving mechanism.

*Driving mechanism.*—This is illustrated particularly in Figs. 3, 6 and 7. Crank 5 is mounted on shaft 17, journaled in the side frame, and also in the casting 21, supported on the side frame 204 of the machine. Mounted rigidly on shaft 17 is spur gear 34, meshing with spur gear 20, fast on shaft 18 (see Fig. 3), the latter journaled in the inside frame and casting above described. Crank arm 24 and ratchet 19 (Fig. 6) are also mounted rigidly with gear 20. Gears 34 and 20 are so proportioned that two revolutions of the former will make one revolution of the latter. Gear 20 is prevented from backward rotation by means of ratchet wheel 19 and pawl 31 mounted at 30 in bracket 21. More than one revolution of gear 20, or two revolutions of handle 5 in a single operation of the machine are prevented by means of a piece 27 secured to the side of gear 20, and a latch 28 pivoted at 29 to bracket 21. A spring 33 tends to hold the upper end of latch 28 out of engagement with piece 27. This is the unlocked position, and is shown in Fig. 3. In this position, the operator can turn handle 5. Toward the close of a complete revolution of gear 20, pin 35 engages with the curving lower end of latch 28, forcing the upper end of the latch inward into the path of piece 27. The latch and the piece are notched, as shown in Fig. 3, so that in this position latch 28 is held down in its locking position by piece 27, and further operation of handle 5 and its connecting parts are made impossible. The parts are now locked. When an operator wishes to thereafter operate the machine, a slight backward movement of handle 5 will disengage latch 28 from piece 27. Spring 32 holds pawl 31 normally in engagement with ratchet 19.

Crank 24 is connected with crank arm 26 by pitman 25. These parts are so proportioned that a revolution of crank arm 24 causes crank arm 26 to reciprocate through an arc of 110°. Crank arm 26 is fast upon the main driving shaft 36. Upon this shaft are mounted the various cams and other parts which give motion to the different parts of the machine.

*The carriage and its impulse movement.*— This is particularly shown in Figs. 3, 6, 20, 33 and 41. The carriage consists of two frames 85 and 86, which as shown, are light castings. They are connected together by the rod 80, which is preferably made tubular. Rod 80 is securely fastened to one of the members, as shown to frame 86, but is free to slide a little in member 85. The castings 85 and 86 are free to slide or reciprocate on rods 77 and 76 respectively, the latter being secured in the frame work of the machine. The loose connection between rod 80 and member 85 is to prevent binding of the carriage upon the rods 76 and 77. The member 85 carries the punches to and fro while the member 86 carries the selecting blocks 83 and 84.

It is important that the reciprocating movement of the carriage should always be of the same extent, and also that the initial or forward movement of the carriage should cease before the similar movement of the parts which drive it cease, and also that the carriage and connecting parts should remain at rest for a certain period of time, as for example, during the punching operation and the printing operation. For this reason, I have preferably provided an impulse mechanism for driving the carriage, which causes the main driving means of the machine to actuate the carriage during only a part of its movement. This impulse mechanism is particularly shown in Figs. 20 and 41. Arm 262 is rigidly mounted on main driving shaft 36. It has a projecting piece 263. Directly in the path of movement of piece 263 lie pawls 255 and 266. These pawls are mounted upon a swinging plate 257, fast upon a sleeve 258 loose on shaft 36. Pawl 255 is pivoted to this plate at 256, and pawl 266 is pivoted to the plate at 265. A spring 261 tends to pull the ends 260 and 270 of the pawls toward each other. In the position of the parts shown in Fig. 20, the projecting piece 263 lies to the left of tail 264 of pawl 266. This piece 263 is shown as having its face shaped like a part of a circle or part of a ring, having as its center the shaft 36. As arm 262 and piece 263 move upward and in the direction of the arrow, shown in Fig. 20, pawl 266 becomes free under the influence of spring 261 to rotate on its pivot to the left, as viewed in Fig. 20, when the latter end of piece 263 passes beyond tail 264, the tail moving to the left and beyond projecting piece 263. This removes locking end 270 from groove 269 in the curved sector piece 251, secured to the framework of the machine. Up to this time, locking end 270, in groove 269, prevented any movement of plate 257. At the same time that projecting piece 263 clears tail 264, it engages with tail 259 of pawl 255, and begins to rotate plate 257 in the direction of the arrow. In this position of the parts, and during both the forward and backward movement of plate 257, piece 263 lies locked between the tails 264 and 259 of the pawls. In this way, a rigid connection is made between the driving shaft 36 and plate 257, and the resulting operation of the carriage is made certain and definite.

The parts all move together until the head of pawl 255 strikes stop pin 253, mounted at 252 on bracket 281 secured to the framework. This rotates pawl 255 on its pivot slightly to the left, throwing locking end 260 into notch 254 of sector piece 251, and locking plate 257 from further movement in this direction. As it is desirable that shaft 36 shall continue to rotate longer in order to effect certain subsequent operations, arm 262 and piece 263 are unlocked from plate 257. This is done by the rotation of pawl 255 on its axis, as this throws tail 259 to the right, as viewed in Fig. 20, out of the path of piece 263. Shaft 36 then continues its forward rotation. On the return movement of shaft 36 and arm 262, piece 263 engages with tail 264, releasing locking end 260 from notch 254, and rotating plate 257 back to its original position, when the knob of pawl 266 strikes the stop pin 267, mounted on bracket 268, releasing tail 264 from projecting piece 263, and causing locking end 270 to enter notch 269, and locking plate 257 in its original position. Arm 262 and its projecting piece 263 and shaft 36 still continue to move a slight distance to their original positions. Reciprocating movement is imparted from plate 257 to the carriage through sleeve 258 and arm 37, secured to link 87, the other end of the link being fastened to the rod 80. (See Fig. 6). By the above means a fixed and definite length of movement is given to the carriage in its reciprocations; this movement does not begin until after the main driving means have been moved some distance and it ceases before the driving means cease their movement. The carriage remains at rest a short time, and is then moved back to its original position.

During the forward and backward movement, and while at rest, the carriage is securely locked, during the movement to the driving means and during the periods of rest to stationary parts of the mechanism. The carriage is employed to carry the punches to their proper position, and also to move the selecting devices. These will be separately considered.

*The punching mechanism.*—This is particularly shown in Figs. 4, 6, 7, 21, 22, 23, 29 and 33. The means for limiting the movement of the elapsed time indicating mechanism at one limit of its elapsed time indicating operation in accordance with the time of a first or "in" operation of the machine which I preferably employ in my improved machine are time marks made upon a card. In the form of machine shown, these marks are shown as holes made by punches, there being a punch for the hour mark and one for the minute. The punches are mounted to reciprocate freely on rods 294, and 299, secured in the framework of the machine. Both punches, the hour and the minute one, are connected to the member 85 of the carriage and are moved by it by means of detachable connections. These detachable connections are controlled by the clock movement. The punching devices for the hour and minute are exactly alike. Accordingly, the hour punch and its connections will be described. They are shown in detail in Figs. 21 and 22.

315 is the apron of the punches secured by screws, as shown in Figs. 21 and 22, to the punch proper, which consists of a lower part 316 and an upper part 317, pivoted to the lower part at 295. A compression spring 383 tends to raise the upper part of the punch. Member 85 carries a piece 314 on each side, while member 86 carries a piece 384 on each side (as indicated in dotted lines in Fig. 25). In Fig. 21 piece 314 is shown as secured to carriage member 85, by studs 307. The other piece 314 is similarly secured, as are pieces 384 to member 86. As the carriage moves forward, each punching mechanism is drawn in the same direction by its corresponding piece 314, through a hook 306, on the piece engaging the locking end 319 of dog 304, pivoted at 320 in apron 315 of the punch. Mounted beneath the punch and parallel with it is a pin cylinder 233. The hour pin cylinder shown in Fig. 21 is mounted on a rod 78, (Fig. 6) which is driven by the clock work and revolves intermittently once in every twenty-four hours. The minute pin cylinder is mounted on rod 79 and revolves continuously once every hour. Each of the pin cylinders has a set of pins projecting radially from it, and arranged in the form of a spiral helix on its surface. This spiral helix arrangement is made necessary by the fact of the rotation of the pin cylinder and the fact that each additional hour or minute requires the corresponding pin to be set further along the cylinder so as to give further travel for the longer time to the punch. The pin cylinder for the minute punch is exactly like that shown and described for the hour one, except that its surface is provided with sixty pins instead of twenty-four. Arranged parallel with rod 294 is a rack 300, securely mounted in cross-supporting castings 23 and 290, of the framework (see Figs. 3 and 5). A similar rack 301 is provided for the minute punch (see Fig. 6).

Resting against the tail 319 of locking dog 304 is a pin 305 of a bell crank lever 303 pivoted to the apron at 318. A spring 313 normally holds dog 304 with tail 319 upward, as shown in Figs. 21 and 22. As the punch is drawn by the carriage along pin cylinder 233, the lower end of bell crank lever 303 will come into contact with one of the pins of the pin cylinder, the particular pin thus engaged being dependent upon the particular hour of the operation of the machine. When the bell crank lever strikes the pin of the pin cylinder, pin 305 forces the tail 319 of dog 304 downward and out of engagement with catch 306 of piece 314, releasing the hour punch from connection with the carriage. At the same moment the other end of dog 304 is forced into one of the notches in the lower part of locking bar 300, thus locking the punch securely in position. Rack 300 is provided with twenty-four notches and the minute rack 301 with sixty notches, one for each pin on the corresponding pin cylinder. After the punch is freed from the carriage, the carriage continues the rest of its travel. Immediately after the dis-engagement of tail 319 from catch 306, tail 319 remains in engagement for a short time with the flat under surface of piece 314, holding the upper end of dog 304 in engagement with the rack. If there were no other locking means provided, however, spring 313 would pull locking piece 304 out of engagement with locking rack 300 as soon as piece 314 cleared tail 319. To guard against such unlocking, I preferably provide a secondary lock 308. This is a locking piece pivoted to the apron at 310. Spring 313 is secured at one end to this locking piece 308. A pin 311 fastened to piece 314 is normally in engagement with a groove in the secondary lock 308, as shown in Fig. 21. As piece 314 leaves the punch, pin 311 will tilt the secondary lock 308 upward, on account of the downward inclination of the groove, until the right angled lower part of dog 304 is caught in the right angle notch at the upper left hand part of the lock 308. This position is shown in Fig. 22. In this position of the parts the upper end of the dog 304 is securely held in engagement with rack 300. Upon the return of the carriage, pin 311 will enter the groove in 308, taking it out from engagement with dog 304. Piece 314 will then come into contact with projecting pin 309 of the apron and move the punch in a direction opposite to that indicated by the arrow in Figs. 21 and 22, returning the punch and its connections to their original position. This will cause the tail of the locking dog to rise up in the recess under the hook 306 in piece 314. The punch is now securely united with the carriage and continues to move backward with it until brought to its initial position. A good view of the hour pin cylinder and the locking rack is had in Fig. 4.

It will be understood that the minute punch and connecting mechanism are constructed in substantially the same manner, except that the pin cylinder and rack are provided for sixty minutes instead of twenty-four hours, and that the mechanism is built left-handed to that described and illustrated above.

In order to prevent overturning of the punches on their respective rods 294 and 299, the lower member is made jaw-shaped and rests on the upper edge of its rack 300 or 301, respectively, as shown in Fig. 6. The lower edges of the racks 300 and 301 serve as a guide for each of the punches, as shown. The parts of the punch body engaging with the upper and lower parts of the racks 300 and 301 are also clearly shown in Fig. 23. To keep the lower member in complete alinement with the upper die member, the sides are carried up as far above the hinge 298 (Fig. 23) as possible.

At the proper time, the upper members 317 of the punches are forced downward, forcing the punches through the card, making the proper time marks. It will be seen from the above that the position of these marks on the card will be dependent upon the time of the operation of the machine.

Any suitable means can be employed for forcing the movable part of the punch downward. As shown, the means employed consist of two oval rods, 296 for the hour punch, and 297 for the minute punch (Fig. 6). These rods are preferably oval in cross-section, and pass through openings in the upper member of the punch. Normally, the oval rods are not in contact with the sides of the opening of the punch, thus permitting the punches to move without friction or binding along the rods. To depress the upper members of the punches, these rods are rotated on their axes. This is caused by suitable cam mechanism, to be hereafter described. When the rods are rotated back to their normal position, the compression spring lifts the upper member to its original upper position, but in case the punch should stick in the die, as it sometimes does, the upper surface of the oval rod will come into contact with the upper side of the opening, and positively start the upper punch member upward. The rest of the upward movement is accomplished by means of the spring. It will be seen that the punch is entirely free from the actuating oval rods, and can slide freely on them, thus avoiding any cramping between the two.

At the same time that the punches are forced through the card, an impression is printed upon the card from the "in" type wheels 161 and 162, which wheels are directly connected to and controlled by the clock movement. The impression mechanism for this purpose is shown in side view in Fig. 4. An impression pad is mounted, as there shown, on the free end of a spring arm 394, see Fig. 4. This free end is forced upward by means of a cam 231 (see Fig. 4) on shaft 75, forcing the impression pad against the card and the ink ribbon 109 and the type wheels 161 and 162. Rod 75 is pivoted in the back and front supports 290 and 23 of the machine, and is actuated from the same source as the oval rods 296 and 297. As the rod 75 turns, it forces the pad upward, printing the hour and minute of its operation upon the card. At the same time that the oval punch actuating rods are returned to their normal position, the rod 75 is returned to its normal position. Referring to Fig. 36, the space filled in by this operation is shown upon the card after the word "In" and in the card as shown, the time of the "in" operation is printed as "8:14." This is done at the same time that the holes 346 and 347 were punched in the card. The printing mechanism on the other side of the machine which prints the elapsed time indicated by elapsed time type wheels 198 and 199, and which prints the finishing time, as indicated by the time type wheels 166 and 167, which are connected to and controlled by the clock work, are very similarly operated. In addition to the above, the various printing devices and punching devices are provided with cut-out devices, all of which will be presently described.

*The devices controlled by the time marks for limiting the movement of the elapsed time recording mechanism.*—The mechanism for this purpose shown in the machine of the drawings consists of a pin box and pins, one for the hour and one for the minute, and also selecting devices acting in coöperation therewith.

I will first describe the pin box and the mechanism which causes the pins to come down on to the card. This is shown particularly in Figs. 3, 5, 6, 7, 25, 28, 40 and 43. In Fig. 28 the pin box is shown in cross-section on an enlarged scale, and in Fig. 40 in perspective. It consists of two cages 225 and 226 slidably mounted on a casting 227. The casting 227 is rigidly secured to the front and back struts 23 and 290 of the framework. The two cages are joined together by two bars 228, one of which only is shown in Fig. 28. These bars prevent any side or longitudinal movement of the pin cages 225 and 226. Each bar 228 is arranged in a vertical slot in each side of the casting 227. It therefore allows the pin cages to travel up and down for a limited distance vertically. 221 and 222 are selecting pins mounted in the cages. It will be seen (see Fig. 43 at 221), that each of the pins is provided with a pair of small ears near its lower end, which are stamped upon the pin itself to prevent the pin from slipping too far downward. The upper and lower flanges of each cage are provided with a row of holes, one in each flange for each pin. The pins normally project through the lower row of holes and rest upon the ears. A spring 223 encircles each pin between its ear and the upper flange, normally holding the ears against the lower flange, as shown in Fig. 28, but permitting the pin to rise upward through the hole in the upper flange.

To cause the cages to move up and down I have provided a cam 271 (see Fig. 5), fast on shaft 36. A lever 284 having a roller engaging with a groove in the cam, as shown in Fig. 5, is pivoted in the side frame 204 at 282, and has at its outer end 283 a link connection 285. This link connection is shown broken away in Fig. 5 to allow a clearer view of the minute selector block. At its upper end 285 is pivoted to the bell crank 286 (see also Fig. 40), mounted on the top of the casting 227. A similar bell crank 288, is pivoted near the other end of casting 227 and is connected to bell crank 286 by link 287. On the opposite side of the casting 227 is a crank arm 297 similar to the upper part of bell crank 286. This is rigidly secured to the same pivot that bell crank 286 is secured to, in order to cause the hour pin cage to descend at the same moment as the minute one. At the opposite end of the pin box, fast on shaft 120, is another crank arm 369 for the hour side. This one is joined to bell crank 288 by strut 289, shown in section in Fig. 5. This strut 289 passes through two ears 289ª, one on each of the cages 225 and 226, and thereby causes them to travel up and down with it. A similar arrangement is provided at the other or front end of casting 227. The cross strut 289ᵇ for this is seen in Figs. 7 and 40, and is carried by crank arm 297 and crank arm 370 also fast on the same pivot.

When the pins are brought down upon the card by the above described devices, the pins corresponding with the two holes 346 and 347 previously punched in the card, will enter those two holes, and will project below the bottom of the card and card receiver, as clearly shown in Fig. 25. For this purpose the card receiver is provided with holes, one for each pin. The other pins will be stopped by the upper surface of the card, their upper ends protruding up through the holes in the upper flange of the cage. The pins that project through the holes in the card and card receiver will engage tripping pawls mounted on the selecting blocks, which I will now describe. These selecting blocks are specially indicated in Figs. 5, 6 and 25. As shown in Fig. 25, the hour selector pawl is about to engage one of the pins 221, in the hour cage 225. The selector block is arranged to slide freely on two guide rods 343 and 345 secured in the framework of the machine. The body of each selector block is made up of a bent piece of metal 206. The shape of the block is shown in Fig. 24, which is a perspective of the hour selector block. Mounted on the face of the block is a locking dog 323 (see Fig. 25), substantially similar to the locking dog connected with the punches already described. This dog is pivoted in the block at 325, and is provided with an upward projection 333, adapted to engage a pin 322, mounted on the lever or tripping pawl 321 on the reverse side of the block. A tail 324 of locking dog 323 engages a hook 384ª on the side plate or draw-bar 384, which is mounted on the member 86 of the carriage, corresponding with the piece 314, already described as mounted on the member 85 of the carriage. A secondary lock 330 pivoted at 326 is also provided similar to the secondary lock 308 on the punches, and is similarly operated by a pin on plate 384.

Dog 323 is provided at its upper end with a part adapted to engage with rack 72, (Fig. 6). A similar rack 170 is provided for the minute selector block. Pin 327 is used for returning the selector block with the carriage in the manner already described for the punches. A spring 331 connects secondary lock 330 with the dog 323. Tripping pawl 321 is hinged to the selector block at 328. When the top end of tripping pawl 321 comes into contact with any of the pins 221 projecting through the card, and below the receiver, as shown in Fig. 25, pin 322 projecting sidewise from tripping pawl 321 presses against the nose 333 of dog 323, and causes it to tilt to the left, as shown in Fig. 25, releasing tail 324 of the dog from the catch or hook 384ª on the side plate of member 86 of the carriage, thus disconnecting the selector block from the carriage. Accordingly, each selector block moves along its rod 343 and 345 until tripped by a projecting pin 221, as described. It is then released from the carriage, and is locked in position by means of the upper end of dog 323, and rack 72 or 170, and the secondary lock 330 holds it locked in the same manner as already described for the punches. The selector blocks are returned to position by the return of the carriage in the manner already described.

*Elapsed time indicating mechanism.*—The form of my elapsed time indicating mechanism shown in the drawings consists of time type wheels, one for the hours and the other for the minutes. As shown, they are time type wheels 198 and 199. These type wheels, as shown, are normally connected with the clock movement, and are driven by it. Upon the operation of the machine by the turning handle 5, they are however, toward the commencement of the operation, disconnected from the clock movement, and are connected to the selector blocks, and are then moved backward by the selector blocks as long as the selector blocks move along their respective rods. The means for disconnecting and connecting will be presently described. The movement of the hour selector block is communicated to the hour elapsed time type wheel by means of a link 332 pivoted to the selector block at 329, and through lever 335 (see Fig. 25), and other mechanism presently to be described. A similar arrangement being provided for the minute selector. The construction of the minute selector block 84 is exactly like that of the hour selector block above described.

I will now proceed to describe the means by which the elapsed time type wheels are disconnected from the clock movement and connected with the selecting blocks and the accompanying parts. These are particularly shown in Figs. 1, 3, 6, 12, 13, 25 and 27. There are two sets of gears in the machine, one on the right hand frame 204, and the other on the left hand frame 143. They are almost alike, and I will, therefore, first describe the hour gearing and then point out the differences between it and the minute gearing. In Fig. 1 the clock shaft 10 connects a spring mechanism in the clock with shaft 126, shown in Figs. 6 and 12. The complete gearing on the hour frame is shown in Fig. 12. On the lower end of shaft 126 is a crown gear 140. Gear 141 is fast on shaft 150, as are also spur gear 144 and locking wheel 145. Meshing with gear 144 is gear 136, (Figs. 6 and 13). Meshing with gear 136 are two gears, sliding gear 128 and gear 132. Gear 128 is slidably mounted on shaft 147, while gear 132 is fast on shaft 148. Gear 136 is loosely mounted on stud 137, which is screwed into the side frame 143. Also loosely mounted on the same stud is gear 133, which has secured to it and rotating with it the small gear 134. In mesh with this gear 134 is sector 138 pivoted on rod 40. When the sector travels its maximum amount, it will turn gear 134 just one revolution in the direction of the full arrow shown in Fig. 12. Sector 138 is secured to arm 335 (Fig. 25). It will, therefore, be seen that the movement of this sector is controlled by the movement of the hour selector block. If the selector block advances a given number of points, the sector will turn the gears 134 and 133 the same number of points. In the condition of the parts, as illustrated in Fig. 12, the clock is driving all of the gears 144, 136, 128 and 132. The direction of motion under the influence of the clock movement is as indicated by the dotted arrows. When a record is being taken, the motion of the clock gears is momentarily arrested, and then gear 128 is slid away from gear 136, toward the right, as viewed in Fig. 13, over to gear 133. It is thus disconnected from the clock drive and is connected to and driven by the selector block.

An alining lever 139 is preferably provided which enters into the space between the teeth of gears 133 and 136 at the moment that the gear 128 is being slid, and, therefore, keeps these gears in perfect alinement, and keeps gear 128 from sticking, due to any inequalities or unevenness. The alining lever is then removed, but is again inserted while the printing is being done in order to keep the printing in alinement. Lever 139 is operated by lever 151 (Fig. 12) which has a roller engaging the cam slot in cam 154. Lever 139 is keyed to shaft 41, and works a similar aliner on the opposite side of the machine. This can be seen in Fig. 3.

In Fig. 12 a pointed rod 146 is shown opposite one of the spaces between the teeth of the locking wheel 145. This is inserted into the space in that wheel at the moment before the clock is disconnected from gear 128, at the beginning of the movement of the driving handle 5. The object of this is to prevent play back and forth when the movement of the other gears commences. Directly after the locking bar 146 is inserted, gear 128 is shifted by lever 127 to its selector driven position. Lever 127 encircles a depression in the collar of gear 128, surrounding shaft 147, and moves gear 128 to the right or left. This movement is controlled by a cam 153 on driving shaft 36 (Fig. 6), lever 152 engaging the cam groove in said cam and being moved by it. Lever 152 is connected to lever 127 by shaft 149 (see Fig. 12).

In Fig. 27 I have shown an inside view of part of the corresponding gearing on the minute side of the frame 204. In this case shaft 209 is driven by the clock in the direction of the dotted arrows. Mounted fast with the shaft is gear 216 and the finder wheel 210. Meshing with gear 216 is gear 46 (Fig. 3). In mesh with gear 46 are gears 47 and 48. The latter gear 48 is the sliding gear corresponding with gear 128 on the hour side. In Fig. 27 the direction of motion of the gears is also indicated by dotted lines when driven by the clock and by full line arrows when driven by the selector blocks. On the minute side the gear 48 is driven normally by the clock work through shaft 4, shaft 42, gears 43 and 44, and gears 216 and 46 as described. When connected with the minute selector block gear 48 is driven through gear 213, corresponding to gear 133 and gear 211, corresponding to gear 134, sector 214, corresponding to sector 138, arm 336, and link 395, connected to the minute selector block.

393 is the alining lever corresponding to lever 139.

218 is the locking lever corresponding to locking lever 146.

The operation of the sliding gear 48 is precisely similar to that of sliding gear 128 serving to connect the minute elapsed time wheel 199 normally with the clock and during the operation of the machine with the minute selector block.

In order to relieve the clock movement from the necessity of driving any more of the parts than is necessary, I preferably drive the hour gearing from an independent source of power. Shaft 4 driving the minute gearing is connected directly with the clock movement. Shaft 10 is connected with an independent source of power, as shown, an independent and separate spring 385 (see Fig. 34), located in the upper part of the casing 1, which drives shaft 10. The devices for this purpose will now be described, and are specially illustrated in Figs. 4, 5, 6, 27, 30 and 31.

Referring to Figs. 30 and 6, pinion 242 is mounted on shaft 209; pinion 242 meshes with spur gear 241, on shaft 240. This shaft is driven by the clock work through shaft 4, and pinions 43 and 44, as already described. On the other end of this shaft 240 is a pinion 249, which meshes with the large gear 248, loose on shaft 150. Also fast on shaft 209 is cam 293 (Fig. 31), which shaft revolves once in every hour. This cam is provided with a notch, as shown in Fig. 31, and into this notch falls the pointed end of lever 244, fast on shaft 245. Fast on the same shaft is arm 246, which normally engages with any one of the teeth of wheel 247, fast on shaft 150. When the nose of lever 244 falls into the notch, spring 239 withdraws arm 246 from contact with the tooth of wheel 247, permitting that wheel to rotate. This wheel is provided with twenty-four teeth. The movement of tooth wheel 247 permits springs 385 (see Fig. 34), through shaft 10 and connecting parts, to rotate the hour gearing. But this movement is limited, because tooth wheel 247 is permitted to move but one point. This is accomplished by means of the pin 243, which is mounted on the side of wheel 247, and which pin enters a slot in gear 248. The slot is of just such length that a movement of but one point is permitted to tooth wheel 247 when its pin 243 strikes against the end of the slot, and further rotation is prevented. Gear 248 rotates one-twenty-fourth of a revolution each hour, the gearing driving it being so proportioned as to give it only this extent of revolution. Accordingly gear 248 moves one point in the direction of the arrow shown in Fig. 31, and, when the nose of lever 244 drops into the notch in disk 293, tooth wheel 247 is permitted to make just the same extent of rotation, namely, one-twenty-fourth of a revolution. In this way the hour gearing is driven from a separate source of power and at the end of each hour jumps forward but one-twenty-fourth of a revolution, as described. After such a jump, shaft 209 continues to rotate, and after a short time, as shown, in about three minutes, or 18° of movement, lever 244 is again forced back out of the notch, and arm 246 again forced into contact with a tooth of tooth wheel 247, thus holding it from further rotation until the termination of the next revolution of disk 293. Lever 244 is mounted at the opposite extremity of shaft 245, from lever 246. The opposite end of spring 239 is secured to the caster or strut 290 of the machine, as shown in Fig. 4.

Shaft 10 is connected to and driven by a large driving wheel 340 (see Fig. 34) through crown gears 337 and 338 and pinion 339. By the above described means, the clock movement proper has no load on it except the turning of the minute gearing and pin cylinder and the stretching of the small spring 239, once in every hour.

It sometimes occurs that when finder rod 218 (Fig. 27) enters one of the depressions in the finder wheel, it has to force the wheel forward a considerable distance, and when released the wheel tends to bound backward. If at this instant the operator inserts a card, he would in all probability secure a record indicating the minute previous to the one secured by the operator in the first instance. This is of no material consequence, except at the even hour. At this time the finder rod must again force wheel 210 ahead and cause the hour to change or jump. If now the finder is withdrawn, wheel 210 must not be permitted to return to the previous unit, or the registration would be one hour later than it ought to be. For instance, let us say that a record has just been taken at 8:00 and the finder had to force the finder wheel forward from 59+ to the even hour to give an even registration. If the record were then taken and 8:00 printed, the hour wheel must have jumped forward from 7:00 to 8:00. If the finder wheel were now permitted to fly back or rebound one minute, the machine would be likely to print 8:59 instead of 7:59. In other words, the hour change is not capable of working backward. This discrepancy from the exact minute is not really of any consequence, as the clock will very quickly catch up to the even minute in any case. But to prevent the turning back of the finder wheel, I provide a metal piece 215, mounted on the side of the said wheel (see Fig. 27). Mounted on the side frame of the machine is a pawl 217, held up by a spring 220. As the finder wheel revolves driven by the clock, it will depress the pawl and let it fly behind the block 215 at the even hour, and prevent it from turning backward at such time.

*Means for operating the punching and printing devices.*—These are especially illustrated in Figs. 5, 6, 42, 44, 45 and 47. Means for operating the punching and printing devices I preferably arrange so that on the first or "in" operation of the machine by an operator, the punching devices and the devices for printing the "in" time will alone be operative, the devices for printing the "out" time and the elapsed time being inoperative, and on the second or "out" operation of the machine by the operator the devices for printing the "out" time and the elapsed time will be operative, and the punching devices and the devices for printing the "in" time will be inoperative. I preferably arrange it so that this will be accomplished automatically. In the form of my invention shown in the drawings, this is accomplished by operatively connecting the punching devices and the devices for printing the "in" time with the driving means of the machine during the first or "in" operation, and by having the devices for printing the "out" time and the elapsed time operatively disconnected from such driving means, and on the second or "out" operation of the machine, having this position of the parts reversed.

The punching devices and the devices for printing the "in" time are connected with the driving means, and operated by them through a link 362, (Fig. 45), and a pin 56 fastened on the end of lever 55 (see also Figs. 3, 4 and 5). The devices for printing the "out" time and the elapsed time are operated by means of a link 363, and pin 56. In the position of rest, both links 362 and 363 are held out of engagement with pin 56, as shown in Fig. 45, by means of two pins 375 fast on shaft 59. The full lines in Fig. 45 indicate the normal position of these pins and the links 362 and 363. These links are pivoted respectively to the ends of levers 65 and 64, fast on shafts 75 and 74 respectively. Shortly after the machine is started, shaft 59 is rotated about 45°, until pins 375 are in the position shown in dotted lines in Fig. 45. Links 362 and 363 are now, so far as pins 375 are concerned, free to move inward toward pin 56, under the influence of springs 62 and 61 respectively. Shaft 59 is rocked, as above described, by means of a cam 386 (see Figs. 5 and 6) fast on cam shaft 36, through a roller on the end of bell crank arm 387, pivoted at 390 in a bracket on the framework, engaging a cam groove in cam 386, the other end 389 of the bell crank lever 387 having pivoted to it a link 388 extending upward to the crank arm 391, fast on shaft 59. Shaft 59 is carried in bearings in the supports 23 and 290 of the machine.

One or the other of links 362 or 363 is prevented from moving inward to engage with pin 56 by devices which I will now describe. A pair of fingers 291 and 270 (see Figs. 42 and 47) are pivoted to a bracket 368 of the framework. They are normally held in their raised position, that shown in Fig. 42, by means of a link 164, having a pin 378 at its lower end working in a slot 379 in each of levers 291 and 270. It will be understood that pin 378 projects on both sides of lever 164, entering the slot in finger 291 on one side, and the slot of finger 270 at the other. At its upper end link 164 is pivoted at 380 to lever 103. This lever is attached to shaft 120, and actuates the ink ribbon mechanism, as will be hereinafter described. In the position of rest, lever 103 is in its raised position, as shown in Fig. 42, holding fingers 291 and 270 in their raised positions, as there shown.

Near the very commencement of the operation of the machine, and just as the pin box is being let down on to the card, if there is one in the "out" slot, the two fingers will be let down by the lowering of lever 103. An opening 377 is provided in the floor of the card receiver immediately beneath the end of each of these fingers. If a card has been inserted into one of the slots in the proper manner and to the full extent, the opening 377 in the floor of the slot or card receiver will be covered by the card, and the finger will rest upon the card. If, however, no card has been inserted in the slot or a card has been inserted but has not been inserted in a proper manner, the opening 377 will remain uncovered, and the end of finger 291 or 270, as the case may be, will fall into the opening. A link 357 or 356 connects each finger with a corresponding bell crank lever 359 or 358 respectively. The other and dependent arm of the bell crank lever 359 or 358 projects downward in proximity to the upper part of links 363 and 362 respectively. When a finger on being lowered rests upon a card, 359 or 358 is not rocked sufficiently to cause its dependent arm to move into the path of movement of its corresponding link 363 or 362. If, however, the finger drops into the opening 377, the dependent arm of said bell crank lever is moved directly into the path of its corresponding link. The effect of this is to prevent that link from moving inward at its bottom end into contact with pin 56, when pins 375 move out of the way.

360 and 361 are stops to prevent the fingers 270 and 291 from falling too far downward. Accordingly, when a card has been inserted into one of the slots in a proper manner, and to the full extent, the corresponding link 362 or 363 is free to move into contact with pin 56, and for this purpose each link is provided at its lower end with a hole into which pin 56 will enter when the link is moved inward. But if no card is inserted in the slot, or improperly inserted, the corresponding link will be held away from pin 56, and the punching or printing devices adapted to be operated by such link will not be operated. In this way, the appropriate punching and printing devices will be operated whenever a card is inserted properly into a slot, and the other punching and printing devices will not be operated.

Link 362, by means of pin 56 and lever 55, operates the punching devices and the devices for printing the "in" time. For this purpose, lever 55 and pin 56 are given a downward rocking movement through the operation of the handle 5 of the machine. This is accomplished by means of a cam 53 (see Fig. 4) on cam shaft 36, and a roller on the inner end of arm 54, moving in a cam groove in cam 53, arm 54 being fast on shaft 39, the latter having fastened upon it lever 55. As the machine nears the end of its forward stroke, lever 55 is forced downward, carrying with it pin 56 and whichever one of links 362 or 363 is connected with it. This motion is transmitted through link 362 to rock bell crank 65 fast on shaft 75. Upon shaft 75 is mounted the pressure printing cam 231, which forces up printing pad 302 against the ink ribbon card and the "in" time type wheels 161 and 162 (see Fig. 6), thus printing the time of the first or "in" operation of the machine.

Pivotally connected to the upper arm of bell crank 65 is a link 66 connected to oval shaft or rod 296. The rocking of this rod forces the hour punch downward, as already described. Fast on oval rod 296 is a toothed segment 71 meshing with a toothed segment 70 fast on oval rod 297, which is similarly rocked, and which, as already described, forces down the minute punch. A spring 68 connected to the framework and to bell crank lever 65 tends to restore the parts to their normal position after being released. In a somewhat similar manner through link 363, the "out" and the elapsed time are printed. When link 363 is pulled downward by pin 56 and lever 55, lever 64 is rocked downward. It rocks shaft 74, to which it is secured, thus rocking cam 230 (see Figs. 6, 29 and 28), and forcing printing pressure pad 229 upward against the card, ink ribbon and the hour and minute type wheels 166 and 167 representing the "out" time, and against the elapsed hour and minute type wheels 198 and 199, thus printing the time of the second or "out" operation of the machine, and also the elapsed time between the two operations. Spring 69, secured to the framework, and lever 64 tend to raise link 363 to its normal position when released. Guards 63 and 376 tend to prevent links 362 and 363 from moving outward or inward too far.

In order to insure the operation of the appropriate devices and to render inoperative those that are not appropriate, and to insure that the indicating or other devices of the machine will not be operative unless a proper card is inserted, and is inserted in the proper way into the card receiver or slot of the machine, I preferably give such a shape to the card and to a part of the card receiver or slot so that the two will coöperate and prevent the operation of the parts unless a proper card is inserted, and is inserted in a proper way. This may be accomplished in any suitable manner by giving any special configuration or shape to the card or any accessory of it, and to any part of any wall of the card receiver or slot, or to any devices in it with which the card may make contact when inserted in the slot, as the forms of such means may be indefinitely varied. I have shown in the drawings, however, a form which I prefer to use for this purpose. It is especially illustrated in Fig. 44, and as there shown, consists of a projection 367 in the rear of the card receiver, and a corresponding detent 367$^a$ in the inner end of the card. The projection and detent are shaped so as to permit the other parts of the inner edge of the card to more nearly approach or to abut against the rear wall of the card receiver. This insures that the card will cover the opening 377 shown in dotted lines in Fig. 44, and heretofore explained. This will insure that the proper punching and printing devices, or the proper printing devices corresponding to the slot into which the card is inserted, will be operated. If the wrong card, as for example, a rectangular one at its inner end, were inserted into the slot, the projection 367 would prevent the card from covering the opening 377, and the printing or punching devices would therefore not be operative. I preferably place the projection 367 and the detent 367$^a$ to one side of the center of the card receiver and the card respectively. This unsymmetrical arrangement insures that the card must be inserted right side up in order to secure an operation of the parts, by making the sides of the projection 367 and the detent 367$^a$, as shown, as the card is also truly alined in the slot. This enables me to make the card of a looser fit in the slot, especially toward the rear end. This is a great advantage where accurate register must be obtained, as in the present machine. It prevents binding of the card during the insertion into the slot, makes it easier for the workman to insert it, as there is less resistance, and permits of the use of a thinner card than would otherwise be necessary.

If desired, the means for rendering the punching and printing devices operative or inoperative may be made so as to be operated manually instead of automatically, as above described. In Figs. 32, 46, 53 and 54 I have illustrated such an arrangement. The various devices are thrown into or out of operative position by means of an "in" and "out" lever 371, which may be placed on the front casing of the machine, as shown in Fig. 46. It is made fast on a shaft 59, and placed over a sector 8, provided with the words "In" and "Out," as shown at 372. Shaft 59 runs through to the back of the machine (see Fig. 53), and there carries a cam 60, as shown in Fig. 32. As handle 371 is moved to the "in" or "out" position, it moves links 58 or 57 away from pin 56, or permits them to approach the pin. Links 58 and 57 corresponding with links 362 and 363 shown in Fig. 45, are adapted to operate the same parts. Pin 56 and through it the links, are operated in the same manner as already described for links 362 and 363. When "in" and "out" lever 371 is in the position shown in Fig. 46, the link 57 is held away from pin 56. When the lever is at the position marked "In," the link 58 is in engagement with pin 56, and link 57 is out of engagement. When lever 371 is between "in" and "out," links 58 and 57 are out of engagement. In the use of this manual device, it is of course necessary for the workman to see that the "in" and "out" lever is turned to the proper position before inserting his card in a slot, namely, to the "in" position before he inserts his card in the "in" slot 15, and to the "out" position before inserting his card in the "out" slot 16.

In order to prevent the moving of the lever 371 after handle 5 has begun its operation, I preferably provide a lock to prevent such a movement. Any suitable locking device may be provided for this purpose. In Fig. 54 I have illustrated one form. This consists of two guide plates 381 and 382 fastened to the base of the machine, one of which is shown (381) in Fig. 53. As soon as pin 56 starts to descend, the ends of the pin will just graze the inside surfaces of these guide plates, and will prevent link 57 or 58, whichever is connected with it, from being thrown off during the subsequent operation of the machine, and until the pin rises again toward the close of the operation. Such guiding means are, of course, unnecessary with the automatic arrangement above described.

*The subtractor mechanism.*—This is specially illustrated in Figs. 6 to 12, 18 and 48 to 52. It will of course be understood that when the minute of the "out" or finished time is a less number than the minute of the "in" time, it is necessary to subtract one from the indication that would otherwise be given upon the hour elapsed time type wheel. Any suitable mechanism for this purpose may be employed. I will proceed to describe that shown in the drawings. Upon the sliding minute gear 48 is fastened a pin 188, which stands directly opposite a tripping lever 189 when the minute type wheel stands at zero. It is normally, however, not in the same vertical plane with tripping lever 189, as is clearly shown in Fig. 8. But it is moved into the same vertical plane when gear 48 is shifted from the clock drive to the selector block driven position, and in that position pin 188 will engage at the proper time with the tripping lever. In Fig. 9 the dotted arrow indicates the direction of movement of the gear 48 when driven by the clock. At this time as pin 188 is not in the same vertical plane with tripping lever 189 the two will not come into contact. If the gear 48 is shifted and gear 48 is moved backward in the direction of the full line arrow by the motion of the selector block, it may come into contact with the tripping lever. In that case it will cause it to tilt up into the position shown in dotted lines in Fig. 9, against the action of spring 353. This will release lever 190 pivoted on shaft 184, from its locked position with the end of lever 191 fast with 189, as shown in full lines in Figs. 9, 50 and 51, permitting lever 190 to assume the position shown in dotted lines in Fig. 9. This movement of lever 190 is due to spring 196, secured to the framework at 185. Lever 190 is fast on shaft 184, and rocks that shaft slightly during the said movement. Fast on shaft 184 is lever 183, which will move into the dotted line position shown in Fig. 10, and through link 182 will slightly rock the cam piece 180, to which link 182 is pivotally secured. Cam piece 180 is pivoted at 181.

177 is a spring pawl pivoted at 179 on arm 175, the latter loosely pivoted on pin 159. The spring 178 tends to hold spring pawl 177 against cam piece 180. When cam piece 180 is at its right hand position, shown in Fig. 10, which is its normal position, spring pawl 177 slides upon it and is not in contact with ratchet 174, but when cam piece 180 is rocked to the left, it permits pawl 177 to come into engagement with a tooth of ratchet 174. If spring pawl 177 is in engagement with ratchet 174 during the operation of the machine, it will feed ratchet 174 one point. This is caused by the rocking of lever 175 on pivot 159. Referring to Fig. 11, it will be seen that pin 129 which is fast in gear 128 is in a slot in the arm 130, which is freely mounted on shaft 147, and which is kept in its correct position by the collar 131. Connected to the arm 130 is a coil spring 172, fast to ratchet 174 at its other end. Ratchet 174 is kept in position by plate 173 which is fast with arm 130. Plate 173 is provided with two studs 176, which work in slots in its surface, which are one-twenty-fourth of a circumference in their length, that is, they allow the studs a movement of one-twenty-fourth of a revolution. Studs 176 are riveted to ratchet 174. The ratchet 174 is fast on the tube 201 on which is mounted the hour elapsed time type wheel 198. Tube 201 is free to revolve on shaft 147. Spring 172 normally keeps the ratchet as far back in the slots against the sides of the studs 176 as possible, as shown in Fig. 10. Ratchet 174 has twenty-four teeth, one for each of the divisions of the hour type wheels. No matter what the time of day, ratchet 174 will always be on one of the even twenty-fourths of the circumference, and, therefore, one of the teeth of the ratchet will always be opposite the flexible pawl 177. As explained above, for the minute wheels the dotted arrow in Fig. 10 represents the direction in which gear 128 is moved by the clock, the arrow in full lines the direction in which it is moved by the selector sector. The numerals seen at the edge of the gear wheel in Fig. 9 opposite each of the teeth, indicate the numerals which are on the minute elapsed time type wheel 199. The printing point in each of the printing type wheels 198 and 199 is indicated in Figs. 9 and 10 by the letter P. It will be seen that when zero on the type wheel is opposite P (Fig. 9) pin 188 is just touching tripping pawl 189. And similarly in Fig. 10, the small numerals around the edge of the gear wheel 128, which is indicated in dotted lines, represent the figures on the elapsed time type wheel 198 and also the time of day. The numbers from 1 p. m. on to midnight are also represented by the numbers 13, 14, etc. In Fig. 9 the numeral 9 is opposite the printing point representing eight minutes, as will be presently described, and in Fig. 10 the numeral 3 (15) is opposite the printing point representing 2 p. m., as will also presently be described; the correct time represented by the two type wheels in this position is 2:08 p. m.

After the elapsed time type wheels are returned to the required position by the selector blocks, pawl 177 is moved upward as above described, and engages the teeth of ratchet 174 standing opposite it, if tripping pawl 189 has been moved by pin 188, and it moves ratchet wheel 174 backward one point. If pin 188 has not made contact with tripping lever 189, pawl 177 is kept out of engagement with ratchet 174 by cam piece 180, in which case pawl 177 does no work. The other end of lever 175 is designated by the numeral 157 (Figs. 10 and 12); connected to this lever by a pivoted joint is lever 156, the lower end of which is connected to crank arm 155, which is pivoted on a pin 158 on the side of frame 143. The other end 160 of lever 155 has a roller at its outer end which runs in a groove of cam 250 (Fig. 18), which is fast on main shaft 36.

In the actual construction of my improved machine, I found it advisable to allow some movement of the carriage at the very beginning of its motion before the selector latch reached a position where it would strike the first pin in the pin box on the minute side, should that pin be projecting downward below the card receiver, as otherwise I found that it was difficult to prevent the said first pin from coming down in its downward movement upon the top of the selector latch instead of coming down entirely before the selector latch reached it. If the pin came down on top of or behind the selector latch, it might or would not operate the selector latch. In order to permit such additional movement of the carriage at the commencement of its motion, I have allowed one unit extra movement for the carriage at the beginning of its stroke, and in order to compensate for such additional extra movement, I have preferably set the elapsed time type wheels at a point one unit ahead of the real time of day. In the form shown in the drawings, this setting of the elapsed time type wheels a unit ahead was necessary in order to insure that the correct elapsed time between two operations of the machine should be correctly printed on the printing line, as it will be apparent that the allowance of the extra movement of the carriage at the beginning of its stroke causes the selector devices to move the elapsed time type wheels backward one unit greater than they should move them theoretically. The setting of the time type wheels one unit ahead, and their movement backward upon selector devices one unit additional thus compensate the one for the other. Any other suitable means may be employed, of course, for giving the additional movement to the carriage at the beginning. This setting forward of the type wheels makes no difference, except at the time when the minute 59 should appear on the minute wheel opposite the printing point P. Instead of 59 actually being opposite the card at this time, the zero of the next minute will appear on the minute wheel opposite the point P. Accordingly, the pin 188 (Figs. 8 and 9) is against the subtractor lever 189. Immediately upon the commencement of the reverse or backward movement of the time type wheels in the subtracting operation, the subtractor lever 189 will be set up, whether it be necessary to subtract one or not. In order to prevent this, I preferably provide the following described arrangement, which is especially illustrated in Figs. 9, and 48–52.

349 is a pin on link 395 connected to the minute selector block. Resting against this pin is a lever arm 192, pivoted at 193, and carrying an extension 354. A spring 350 connects extension 354 with lever 189. Also pivoted at 193 is a piece 352, having a tail 355. A spring 194 connects the end of tail 355 to lever 192. The springs 353, 350 and 194 serve to keep levers 189, 192 and piece 352 normally in the positions shown in Fig. 9. In this position the cut-away portion of the end of piece 352, and the lower end of lever 190 are in engagement with ecah other just as the lower end of lever 190 is in engagement with the cut-away part of arm 191 of lever 189. In this position of the parts both levers 189 and 191 and piece 352 lock lever 190, and prevent spring 196 from pulling lever 190 into the dotted position shown in Fig. 9. Accordingly, when pin 188 at the very commencement of the movement of the carriage engages lever 189, the subtractor set up device will not be operated, even although lever 189 removes lock 191 from lever 190, as the lock of piece 352 is still operative on lever 190, through lever arm 192 still engaging pin 349 on link 395 and not being free to move under the stress of springs 350 and 194. Accordingly, pin 188 will slip by tripping lever 189, and the latter will then be returned to its normal position without subtracting one from the elasped hour time type wheel. At the end of this first unit of movement of the carriage, the lever 192, however, becomes free of the pin 349, due to the movement of the link 395. Accordingly, if after that pin 188 engages lever 189, it will, through the operation of springs 350 and 194, tilt the lever 192, thus causing piece 352 to move downward (see projection 351 Fig. 49,) and release lever 190, which will then be pulled forward by spring 196, and one will be subtracted from the elapsed time hour wheel.

After tripping pawl 189 has been moved or set up, it is reset by means of a crank arm 197 (Figs. 7 and 8), which is moved by an extension pin 219, on the end of rod 289$^b$, which rises at the end of the cycle with the pin boxes (see Fig. 40).

The minute type wheels 162 and 167 representing the "in" and "out" time are connected together by means of a pair of gears 168 and 51, fast on a shaft 207, (see Figs. 4, 5, 7 and 8). This causes these two minute wheels to turn together with a minute train of wheels on the side frame 204.

The reason the word "In" is put after the date on the card, as shown in Figs. 35 to 37, is that on account of the clock being able to register to twenty-four hours' elapsed time, the work might begin late on one day and be finished the next day.

The operation of the machine is as follows. The workman puts his card into the "in" slot at the starting of the job (being careful to see that lever 371 is in the "in" position, if such a lever is present in the structure, thus operatively connecting the devices for printing the "in" time and those for operating the punches with the driving gear of the machine and disconnecting the devices for printing the "out" time and the elapsed time). He then turns the operating handle twice. The first thing that happens is that cam 272 (Fig. 5) forces lever 273 downward, and forces the finders 218 and 146 into engagement with their respective wheels. As lock bar 218 is somewhat nearer finder wheel 210 than lock bar 146 is to notched wheel 145 (Fig. 12), bar 218 engages finder wheel 210 first, and sets it at some even minute, otherwise the hour wheel might register one tooth a little too small, as already explained. This movement is of course against the drive of the clock, but as the drive is fairly flexible and as finder 218 is in engagement but a very short time, it does not affect the time keeping qualities of the clock.

After main shaft 36 is turned a short distance, the impulse mechanism shown in Fig. 12, picks up the carriage and moves it across under the card in a longitudinal direction, carrying with it the punches previously described. In the instance shown in the drawings, as the workman inserts his card at 8:14 there is a pin on the hour pin cylinder at the 8th point from the start of the travel of the punch and another at the 14th point from the start of the punch on the minute side. The pins will, therefore, stop the punches at 8:14, respectively, and when operated by the oval bar will punch the holes in the card which represent that time of the day, namely, holes 346 and 347, shown in Fig. 36. After dropping the punches the carriage continues its travel and after it comes to rest, the punches are forced through the card and at the same instant the impression of the "in" time is taken from the "in" hour and minute type wheels 161 and 162. The result is the card shown in Fig. 36.

When the workman again inserts the card in the machine in the "out" slot, he sees that the lever 371 (if there be one) stands at the "out" position, thus operatively connecting the devices for printing the "out" time and the elapsed time with the driving mechanism of the machine and disconnecting the means for printing the "in" time and for operating the punches. The workman then turns the handle 5 twice. Cam 272 acts as before and the locking alining devices are operated in the same manner as previously. The pin box is pulled down by means of the cam 271. This causes pin number 8 on the hour side to go through hole 346 and pin number 14 to go through hole 347, previously punched in the card. While the pins are being drawn downward, aliner 139 is inserted between the teeth of the wheels 133 and 136 (Figs. 12 and 13) and a similar one is inserted between the teeth of the gears on the minute side. These alining devices stay in position while sliding gears 128 and 48 are slid into engagement with the sector driven gears. The alining devices are now taken out of contact with the gears, the carriage is picked up by the impulse and carried along the under side of the card, as before. It continues to draw the two selector blocks after it until they encounter the pins 8 and 14, respectively, whereupon they are released from the carriage and locked in position.

As explained above, while the carriage is drawing the selector blocks after it, the selector blocks are turning the elapsed time type wheels 198 and 199 backward. This, in effect, subtracts from the finishing or "out" time, at which those wheels stood at the time of the "out" operation, the starting time or the time of the "in" operation of the machine. The difference is of course the elapsed time between the two operations. At the "out" operation of the machine the minute type wheel stood with the numeral 9 on the printing line, as shown in Fig. 9, representing however minute 8, as already described. The selector block in the "out" operation of the machine moves this type wheel backward the distance traveled by the selector block before it reached the time represented by the "in" operation of the machine plus one unit, as already described. That minute was 14, as shown. Accordingly, the selector block had to travel from its starting point 15 points before it reached that point. In other words, it moves the elapsed time minute wheel 15 points backward from the position shown in Fig. 9. This would bring the numeral 54 back upon the printing line, and 54 minutes will be printed upon the card.

At the time of the "out" operation of the machine, the hour wheel stood at 3:00 p. m., representing however 2 o'clock true time. As the hour selector block had to move from zero to 8:00, the hour of the "in" operation, it will move the hour wheel backward nine points. This would bring upon the printing line the numeral 6, clearly seen in Fig. 10. But as the minute of the "out" operation of the machine, 08, is a smaller number than the minute of the "in" operation of the machine, 14, pin 188 in the backward movement of minute gear wheel 48 has been brought into contact with lever 189, thus allowing pawl 177 to engage ratchet 174, and in the further operation of the machine, the spring pawl 177 moves the elapsed time hour wheel 198 one further point backward bringing the numeral 5 upon the printing line instead of the numeral 6. The hour 5 will, therefore, be printed upon the card as the elapsed time in hours.

After the subtraction of the unit on the hour wheel has taken place, printing pads are brought to bear on the type wheels and the card is printed, as shown in Fig. 37, with the "out" time 2:08, and the elapsed time 5 hours and 54 minutes.

In case an unmarked or unpunctured card is inserted in the "out" slot, a cut-out is provided to prevent the printing of the time. This may be accomplished in any suitable way. As shown, the printing pads above the cam 230, (see Fig. 5) are mounted on a strip of thin metal which is slidable on the under side of the card guide trough. The strip of metal is provided with a projection 171 which will be engaged by the ends of the selector blocks should they stay connected to the carriage at the end of the stroke, which, of course, they will do if there are no holes previously punched in the card. When the lug 171 is engaged by either of the selector blocks, it will slide the printing pads out of the position they should occupy directly beneath the type wheels and consequently when the cams 230 push out they will print nothing upon the card. When the carriage and selector blocks are returned to their home position, the selector blocks will engage the lug 205 projecting from the forward end of the said strip of metal and return the printing pads to the printing position. It will be understood that the printing pads are frictionally held in position longitudinally and guided sidewise to take the thrust of the printing cams 230.

*Ink ribbon mechanism.*—Any suitable ink ribbon mechanism may be employed. The particular mechanism shown in the drawings is especially indicated in Figs. 7, 14, 15 and 55, and will now be described. A separate ink ribbon is used for each slot. 109 is the ribbon used for the "in" slot 15, and 108 the ribbon used for the "out" slot 16. Both ribbons are mounted on the same spindles 90 and 91. Ribbon 108 is used for the purpose of reversing the feed of both ribbons. 105 is a roller mounted to rotate freely on the stud 125, carried by vibrating plate 117. This plate is provided with two V-shaped depressions in its upper edge adapted to engage the roller 115, mounted at the end of spring arm 113. This spring arm forms the support for the roller, and keeps it in intimate contact with plate 117. Roller 115 is eccentrically mounted on a small pivot, extending sidewise from the dependent bracket shaped end of spring arm 113, as shown in detail in Fig. 55. This is to cause roller 115 to cross the top of the cone-shaped part separating the two V-shaped depressions from one another suddenly or with a jerk. Plate 117 is mounted at 119 on a casting 96, which serves to support all of the ink ribbon mechanism. Plate 117 is free to oscillate back and forward, but can never move up and down. Back of this plate is another plate 116, also provided with a pair of V-shaped depressions or notches. It has also a roller 114 resting on its upper edge, and supported and pressed downward by spring arm 112. Plate 116 carries two pawls 110 and 111, shown in dotted lines in Fig. 15. Plate 116 also is provided with a slot 118, shown in dotted lines in Fig. 15, through which passes the stud 125, or rather an extension of it. Tension springs 121 and 122 hold pawls 110 and 111 against studs 123 and 124. Opposite each pawl 110 and 111 is a ratchet wheel 97 and 98 respectively. These ratchet wheels are fast on the two spindles 90 and 91 respectively. Two springs 99 and 100, provided with stop collars 101 and 102, encircle the two spindles 90 and 91, and are arranged to keep a friction on the spindles and thus maintain the ribbons at even tension to keep them from sagging against the type wheels.

Plate 116 is pivotally mounted at 104 on the end of oscillating arm 103, which is secured to shaft 120 (see Figs. 15 and 5). It will be remembered that this shaft is employed to move the pin boxes up and down. Accordingly, every time the pin-boxes go up and down, crank arm 103 vibrates and causes plate 116, carrying the pawls 110 and 111, to descend. This downward motion will cause one of the pawls 110 and 111, the one in engagement with its ratchet wheel 97 or 98, to feed both of the ribbons in the same direction. In the position of the parts shown in Fig. 15, pawl 111 is in engagement with ratchet 98, and the ribbons are fed toward the right, as viewed in that figure and in Fig. 14. This feeding to the right will continue until the ribbon has wound up sufficiently on the right hand feed to move roll 105 over somewhat to the left. When this movement to the left has reached a certain point, roller 115 will suddenly jerk over the top of the rise between the two depressions or notches in top of plate 117, and carry plate 117 and roller 105 to the left, roller 115 in that position resting in the right hand depression or notch in the upper part of plate 117. In making this movement to the left, the extension of stud 125 will strike the edge of the slot in plate 116, and cause that plate to move to the left, carrying with it the pawls 110 and 111. In this position of parts, pawl 110 will be in engagement with ratchet 97, and pawl 111 out of engagement with ratchet 98. The feed of the ribbons will then be to the left until roll 105, through the increasing size of the ribbon roll at the left is thrown to the right, bringing roll 115 into the left hand depression in the upper part of plate 117, throwing pawl 111 into engagement with ratchet 98, whereupon the feed is again reversed.

As shown in the device illustrated in the drawings, the indication is given by printing, but of course any other suitable method of indication could be employed if desired, such as a visual indication. The indication also, instead of representing time, might represent any other suitable measurement, such as money values. Wherever the indication is given in time, the indication may be either in hours, minutes or seconds, or any one or more of them.

In the machine shown, the power used to drive the most of the mechanism is supplied by the operator through the movement of the handle. Any suitable source of power could be used, or the power could be supplied in any other suitable way than through the movement of a handle.

The term "starting device", as employed herein, is used broadly to include all of the mechanism requisite for limiting the movement of the indicating mechanism in one direction, dependent upon the first operation of the machine. As thus broadly used, it includes the means for placing upon the card a starting mark, and the means affected or controlled by such mark to limit the extent of movement of the indicating mechanism. In the particular machine shown in the drawings, the starting device is a starting time device and the mark is a time mark placed upon a card or other suitable medium, and the devices, as there shown, for placing such a time mark upon the card are punches which punch holes in the card whose locations represent the starting time for the time of the first operation of the machine, and the devices controlled by the time marks consist of the pins projecting through the card and card receiver, and the selecting devices. Any other suitable starting device may be employed, as well as any suitable starting mark, and the latter need not necessarily be placed upon a card. Wherever a starting mark is placed upon a card, any suitable medium may be employed for receiving such a mark, the term "card" as employed herein being used by me in a broad sense to include any such suitable medium, whether made of paper or metal or other suitable material, and whether commonly known as a card or not, the only requisite being that it be a medium capable of receiving a starting mark. Similarly, the starting marks may be anything capable of being recognized or identified by the identifying or selecting devices. Thus they need not be holes punched through the body of the card or cuts in its edges or other parts, but may be projecting parts formed by turning up or cutting out parts thereof, or by adding other material to the card, or they may be any marks suitable for the purpose.

One or any number of devices may be employed for placing the marks on the card or its equivalent. In the machine shown, two such devices are employed, namely, the minute punch and the hour punch, and their connecting parts. Each of these devices is shown as movable over the card, although under certain circumstances and suitable modifications, the card might, of course, be made movable relative to such devices. The devices controlled by the time marks, as shown herein, consist of pins and selecting fingers and their connections. But any other suitable form of devices may be employed, as desired, the only requisite being that they be capable of being controlled or actuated by the marks on the card or equivalent, and of starting into operation the indicating mechanism or of limiting its movement.

We have preferably shown the card receiver or receptacle as consisting of two separate and distinct parts or slots, one for the "in" or first operation of the machine, the other for the "out" or second operation; although this is not essential, as with suitable modifications a single slot, or any number might be employed.

In the machine shown, the subtracting operation to obtain the elapsed time between two operations of the machine, is accomplished by moving the indicating mechanism backward. Such backward movement is not essential, as any movement of the indicating mechanism may be employed, the control of which by the starting device will give the elapsed time between the two operations of the machine.

The machine shown in the drawing, not only prints the elapsed time upon the card, but also prints the time of the "in" and the time of the "out" operation of the machine. Either or both of the latter may be omitted, however, if desired. Where either one or both are printed, they may, of course, be printed on any appropriate place on the card.

In my improved machine, the presence or absence of a card or the use of an improper card, or the improper insertion of the right card, controls the devices for placing a mark or print upon the card, rendering them operative or inoperative as the case may be. In the form of machine shown in the drawings, this is accomplished by means of a lock, which prevents the operation of such devices, or one or more of them when no card is present in the slot, or when an improper card is inserted or a card is inserted improperly. My improvement is not, however, limited to such specific form, as with suitable modifications the insertion of a proper card in the right way into the slot might be made directly to render such devices operative instead of removing a lock. The term "device for placing a mark or print upon a card" as used broadly herein, includes any suitable device for placing a starting mark or a starting time mark upon the card, such for example, as a punch for punching a hole in the card, as shown, and also any device for printing upon the card, such as the type wheels for printing the "in," "out" and elapsed times.

The coöperating parts of the card receiver and the card, which serve to make operative or inoperative the marking or printing devices, in the form of machine shown in the drawings, consist of a projection on the wall of the receiver and a detent or cut-away portion on the card, corresponding in shape and coöperating one with another. These coöperating parts may, of course, be made in any suitable way, as for example, the projection might be on the card, and the cut-away portion in the card receiver or some part connected with it, or the coöperating part in the machine might be something other than the wall of the card receiver, as for example, a part projecting into the card slot or receiver.

Any suitable form of clock movement may be employed and it may be located at any suitable point. As shown, it is located in the elapsed time indicating machine itself. This, however, is not essential for some features of my invention, as the actuation or control by the clock movement may be exercised from any point.

By means of my improvement, elapsed times of any number of operators may be taken upon the same machine, and as rapidly as cards can be inserted and the handle be operated, and this wholly irrespective of the order in which said cards are inserted. The indications are accurately, quickly and legibly printed upon the card, requiring no calculation. The time marks are small, and are not easily counterfeited. The printing of the "in" and the "out" time upon the card also tends to prevent the possibility of any deception on the part of the workman, as well as affording an easy means for verification of the accuracy of the elapsed time printed upon the card. The machine is entirely automatic, in its preferred form, except for the mere insertion of the card by the workman and the turning of the handle.

It will be understood, of course, that many departures from or changes or modifications in, or additions to the devices shown in the drawings other than those specifically referred to in the above specification could be made without departing from my invention.

The card shown and described herein is not claimed in this application, but is not abandoned by me, as it is intended to make it the subject-matter of another application for a patent.

What I claim as new, and desire to secure by Letters Patent is:—

1. The combination of a clock movement, elapsed time indicating mechanism normally connected to and driven by the clock movement, means for disconnecting it therefrom and reversing its motion, and a time device representing a prior time adapted to control the stoppage of such reverse motion whereby the elapsed time between two operations will be indicated by the elapsed time indicating mechanism.

2. The combination of a clock movement, elapsed time indicating mechanism normally connected to and driven by the clock movement, means for disconnecting it therefrom and moving it, and a device representing a prior time adapted to limit such movement, whereby the elapsed time between two operations will be indicated by the elapsed time indicating mechanism.

3. The combination of indicating mechanism, means for operating it in one direction, means controlled by the operator for disconnecting the indicating mechanism from the operating means and moving the indicating mechanism in the other direction, and a device adapted to be set by a prior operation of the machine to stop such reverse movement of the indicating mechanism, whereby the indicating mechanism will be caused to indicate the difference between two operations of the machine.

4. The combination of elapsed time indicating mechanism, means for moving it one way in accordance with true time, and means for moving it the reverse way in accordance with the time of a prior operation to give the elapsed time between the two operations.

5. The combination of a clock movement, elapsed time indicating mechanism controlled by the clock movement to indicate the time of an operation, and means for subtracting upon such mechanism a prior time from the time of such operation.

6. The combination of a clock movement, elapsed time indicating mechanism normally connected to and driven by the clock movement, and means for moving said elapsed time indicating mechanism in a reverse direction a distance representing a prior time, whereby such prior time will be subtracted from the time represented by said mechanism and the elapsed time between the two will be indicated thereby.

7. The combination of a clock movement, elapsed time indicating mechanism normally connected to and driven by the clock movement, means for disconnecting it therefrom and moving it in the reverse direction, a time device adapted to be actuated to stop such reverse movement when it has equaled the movement from zero to the starting time, whereby the starting time of an operation will be subtracted on the elapsed time indicating mechanism from the finishing time of said operation and the elapsed time between the two will be indicated by the elapsed time indicating mechanism.

8. The combination of a clock movement, elapsed time indicating mechanism normally connected to and driven by the clock movement, means for disconnecting it therefrom and moving it in the reverse direction, a card, a time device adapted to be actuated by a time mark on the card to stop such reverse movement when it has equaled the movement from zero to the starting time, whereby the starting time of an operation will be subtracted on the elapsed time indicating mechanism from the finishing time of said operation and the elapsed time between the two will be indicated by the elapsed time indicating mechanism.

9. The combination of a clock movement, a time type wheel normally connected to the clock movement and driven by it in one direction and normally representing the true time, means for moving the type wheel in the reverse direction normally disconnected from said type wheel, means for disconnecting the clock movement and the type wheel and for connecting the latter and the means for moving it in the reverse direction, and a time device adapted to represent the time of the first operation of the machine and to control the stopping of the reverse movement of the type wheel, and printing devices for printing such a difference.

10. The combination of a clock movement, a time type wheel normally connected to the clock movement and driven by it in one direction and normally representing the true time, means for moving the type wheel in the reverse direction normally disconnected from said type wheel, means for disconnecting the clock movement and the type wheel and for connecting the latter and the means for moving it in the reverse direction, whereby the latter means will cause the type wheel to move in the reverse direction, a card, a device adapted to be actuated by a time mark on the card, representing the time of starting, to control the stopping of such reverse movement when it has equaled the movement from zero to the starting time, whereby the starting time of an operation will be subtracted upon the time type wheel from the finishing time of said operation, and the elapsed time between the two be indicated by the time type wheel, and printing mechanism for printing such elapsed time.

11. The combination of a clock movement, elapsed time indicating mechanism normally connected to and driven by the clock movement, means for disconnecting it therefrom and moving it in the reverse direction, a card, a device for placing a mark on the card representing the time of a prior or starting operation, a device adapted to be actuated by such mark to control the stopping of the reverse movement of the indicating mechanism when it has equaled the movement from zero to the starting time, whereby the elapsed time indicating mechanism will indicate the elapsed time between the two operations.

12. The combination of a clock movement, elapsed time indicating mechanism normally connected to and driven by the clock movement, means for disconnecting it therefrom, means for moving it in the reverse direction, a card, a device adapted to travel over the card a distance representing the starting time and to place a time mark on the card at the limit of such travel, a device adapted to be actuated by such time mark on the card to control the means moving the indicating mechanism in the reverse direction when the reverse movement has equaled the movement from zero to the starting time, whereby the elapsed time indicating mechanism will indicate elapsed time between the two operations.

13. The combination of a clock movement, elapsed time indicating mechanism normally connected to and driven by the clock movement, means for disconnecting it therefrom, means for moving it in the reverse direction, a card, a device adapted to travel over the card a distance representing the starting time and to punch a hole in the card at the limit of such travel, a pin adapted to pass through such hole and project on the other side of the card into the path of the means moving the indicating mechanism in the reverse direction and to control the stopping of such reverse movement.

14. The combination of elapsed time type wheels, a clock movement, connections between the clock movement and the type wheels, means for moving the type wheels in the reverse direction, connections between said means and the time type wheels, a device adapted to form part either of the connections between the clock and the time type wheels or between the reverse movement driving means and the type wheels and adapted to be moved from operative engagement with one set of connections into operative engagement with the other set of connections and vice versa, a time device for stopping the reverse movement of the time type wheels when that movement has equaled the movement from zero to the starting time, and printing devices for printing the indication on the type wheels, whereby the elapsed time between two operations may be printed by the time type wheels.

15. The combination of a clock movement, elapsed time indicating mechanism normally connected to and driven by the clock movement, means for disconnecting it therefrom, means for moving it in the reverse direction including a selecting device, a card, a device adapted to travel over the card a distance representing the starting time and to punch a time hole in the card at the limit of such travel, pins representing subdivisions of time adapted to be brought into engagement with the card and to project through wherever a hole has been punched therein and to intersect the selecting device in its movement and to disconnect it from its moving means, means for locking the selecting device and indicating mechanism in such position, printing devices, and means for returning the parts to their normal position, whereby the elapsed time indicating mechanism will indicate the elapsed time between the two operations.

16. The combination of elapsed time indicating mechanism, a device for placing upon a card a time mark representing the time of a first or starting operation adapted to affect the extent of the elapsed time operation of such indicating mechanism, and a printing device adapted to print upon the card the time of placing such time mark up it.

17. The combination of a card, a device for placing upon the card a time mark representing the time of a starting operation, elapsed time indicating mechanism adapted to be affected in its indicating movement by said mark and to print the elapsed time between two operations, a printing device adapted to print upon the card the time of placing such starting time mark on the card and operating means under the control of the operator for operating the time-mark-placing device and the starting-time-mark printing device.

18. The combination of a card, a device for placing upon the card a time mark representing the time of a starting operation, elapsed time indicating mechanism adapted to be affected in its indicating movement by said mark and to print the elasped time between two operations, a printing device adapted to print upon the card the time of the second or later of such operations and operating means under the control of the operator for operating the time-mark-placing device and the starting-time-mark printing device.

19. The combination of a card, a device for placing upon the card a time mark representing the time of a starting operation, elapsed time indicating mechanism adapted to be affected in its indicating movement by said mark and to print the elapsed time between two operations, a printing device adapted to print upon the card the time of placing such starting time mark thereon, and a printing device adapted to print upon the card the time of the second operation of the machine, whereby the accuracy of the operation of the parts may be verified.

20. The combination of a card, a device for placing upon the card a mark representing a starting operation, indicating mechanism adapted to be affected in its indicating movement by said mark and to print data representing the difference between two operations of the machine, and printing devices adapted to print upon the card the data of the first and second operations respectively, whereby the accuracy of the operation of the parts may be verified.

21. The combination of a clock movement, elapsed time indicating mechanism connected to and driven by the clock movement, means for disconnecting them, means for moving the indicating mechanism in the reverse direction, a card, a device adapted to place upon the card a mark representing the time of a first operation, a printing device for printing such time upon the card, a device adapted to be actuated by the said mark to stop the reverse movement of the indicating mechanism to cause it to indicate the elapsed time between the two operations, a printing device for printing upon the card the time of such stoppage, and a printing device for printing upon the card the elapsed time between the operations appearing upon the indicating mechanism, whereby the accuracy of the operation of the parts may be verified.

22. The combination of a card, a device for placing a mark or print upon the card, and a part controlling the operation of such device adapted, when arrested in its movement by the presence of the card, to cause the printing or marking device to be operative and, when not thus arrested, to cause such device to be inoperative.

23. The combination of a card, a device for placing a mark or print upon the card, means adapted to be connected with such device to operate it, a stop for preventing such connection, normally inoperative, and a part controlling the operation of the stop adapted, when arrested in its movement by the presence of the card, to cause the stop to be inoperative and, when not thus arrested, to cause the stop to be operative to prevent the connection of the operating means and the marking or printing device.

24. In an elapsed time recording mechanism, the combination of a card, elapsed time recording mechanism for recording upon the card the elapsed time between two operations of the machine, driving means for operating the recording mechanism, connections between the driving means and the recording mechanism adapted normally to connect them, a stop, normally inoperative, for preventing such connection, a part adapted when not arrested in its movement by the presence of the card, to move such stop into its operative position to prevent such connection.

25. In an elapsed time indicating machine, the combination of a card provided with a detent, a card receiver provided with a projection shaped to fit the said detent, an opening in the receiver adapted to be closed when the card is properly inserted in the receiver, a device for placing a mark or print upon the card, a locking device for rendering the marking or printing device inoperative, and a part controlling the operation of such locking device adapted, unless arrested by the presence of a card in the card receiver, to pass through the opening and to render the locking device operative, but adapted, when arrested by the card, not to pass through the opening and cause the locking device to be inoperative.

26. In an elapsed time recording machine, the combination of elapsed time recording mechanism, a recording device adapted to record the time of a first or "in" operation of the machine, a recording device adapted to record the time of a second or "out" operation of the machine, and means for rendering one of said recording devices operative and the other inoperative at any operation of the machine, whereby either the time of the first or the time of the second operation, but not both, will be recorded along with the record of elapsed time.

27. The combination of elapsed time indicating mechanism, clock-controlled in its normal operation so as normally to indicate the true time, and means for subtracting the starting time from the normal condition of the indicating mechanism so as to cause it to indicate the elapsed time between the starting time and the true time.

28. In an elapsed time indicating machine, the combination of elapsed time indicating mechanism and a punch for punching a time mark in a card, a common means for operating both and means for rendering the punch operative or inoperative.

29. In an elapsed time indicating machine, the combination of a printing device adapted to print the time of the first or "in" operation of the machine, a printing device adapted to print the time of the second or "out" operation of the machine, and means for rendering either one of said devices operative to print its indication, and rendering the other inoperative to print its indication.

30. In an elapsed time indicating machine, the combination of a printing device adapted to print the time of the first or "in" operation of the machine, a printing device adapted to print the time of the second or "out" operation of the machine, a common operating means for such devices, and a device for operatively connecting either one of such printing devices with the common operating means to print its indication and operatively disconnecting the other printing device from the said operating means.

31. The combination of a device for placing upon a card a time mark representing the time of an operation, a printing device adapted to print upon the card the time of placing such mark thereon, elapsed time indicating mechanism, means for printing upon the card the elapsed time indication of such indicating mechanism, and means for rendering either the said marking device and the time printing device or the elapsed time printing means operative and rendering the other inoperative.

32. In an elapsed time indicating machine, the combination of a device for placing a time mark upon a card representing a starting or first operation, a printing device adapted to print upon the card the time of the placing of such mark thereon, a printing device adapted to print the time of a second or "out" operation of the machine, a device for printing the elapsed time between the said two operations, a common operating means for the foregoing devices, and means for automatically operatively connecting either the marking and the "in" printing devices with the common operating means, or the "out" and elapsed time printing devices with said common operating means, and disconnecting the other devices from such means.

33. In an elapsed time indicating machine, the combination of a device for placing upon a card a mark representing the time of a first or starting operation, a printing device adapted to print upon the card the time of the placing of such mark thereon, a printing device adapted to print the time of a second or "out" operation of the machine, a device for printing the elapsed time between the said two operations, a common operating means for the foregoing devices, and means for manually operatively connecting either the marking and the "in" printing devices with the common operating means, or the "out" and elapsed time printing devices with said common operating means, and disconnecting the other devices from such means.

34. In an elapsed time indicating machine, the combination of a device for placing upon a card a mark representing the time of a first or starting operation, a printing device adapted to print upon the card the time of the placing of such mark thereon, a printing device adapted to print the time of a second or "out" operation of the machine, a device for printing the elapsed time between the said two operations, a common operating means for the foregoing devices, means for manually operatively connecting either the marking and the "in" printing devices with the common operating means, or the "out" and elapsed time printing devices with said common operating means, and disconnecting the other devices from such means, and a lock for preventing the changing of the manual connecting and disconnecting means during the operation of the machine.

35. In an elapsed time indicating machine, the combination of a device for placing upon a card a mark representing the time of a first or starting operation, a printing device adapted to print upon the card the time of the placing of such mark thereon, a printing device adapted to print the time of a second or "out" operation of the machine, a device for printing the elapsed time between the said two operations, a common operating means for the foregoing devices, means for manually operatively connecting either the marking and the "in" printing devices with the common operating means, or the "out" and elapsed time printing devices with said common operating means, and disconnecting the other devices from such means, and an automatic lock for preventing the changing of the manual connecting and disconnecting means during the operation of the machine.

36. In an elapsed time indicating machine, the combination of a device for placing upon a card a mark representing the time of a first operation, a printing device adapted to print upon the card the time of the placing of such mark thereon, a printing device adapted to print the time of a second or "out" operation of the machine, a device for printing the elapsed time between the said two operations, a common operating means for the foregoing devices, a lock for normally separating the said devices from the common operating means, and means actuated by the operation of the machine for removing such lock from locking position.

37. In an elapsed time indicating machine, the combination of a card, a device for placing upon the card a mark representing the time of a first operation, a printing device adapted to print upon the card the time of the placing of such mark thereon, a printing device adapted to print the time of a second or "out" operation of the machine, a device for printing the elapsed time between the said two operations, a common operating means for the foregoing devices, a lock for normally separating the said devices from the common operating means, and means for removing such lock from locking position, a second lock for the marking device and the "in" printing device also tending to separate said devices from the common operating means, but adapted to be held out of locking position upon the proper insertion of a suitable card in the "in" slot of the machine, and a second lock for the "out" and elapsed time printing devices tending to separate such printing devices from the common operating means but adapted to be held out of locking position by the proper insertion of a suitable card in the "out" slot.

38. The combination of elapsed time indicating mechanism, a card, a device for placing on the card a mark representing the time of such operation, a card-controlled device adapted to be actuated by such mark to affect the extent of movement of the indicating mechanism, driving means having a to and fro movement, a reciprocating carriage, detachable connections between said carriage and the time marking device adapted to cause the carriage to move the latter device until detached therefrom, detachable connections between the carriage and the card-controlled device adapted to cause the carriage to move the latter until detached therefrom, and detachable connections between the driving means and the carriage adapted to cause the driving means to be connected with and to drive the carriage during only a portion of its reciprocating movement, whereby the carriage will move only a portion of the reciprocating movement of the driving means and will move the time marking device and the card-controlled device while connected therewith.

39. The combination of indicating mechanism, a starting device, a device adapted to be actuated thereby to affect the extent of movement of the indicating mechanism, reciprocating driving means, a reciprocating carriage, detachable connections between said carriage and the starting device adapted to cause the carriage to move the latter until detached therefrom, detachable connections between the carriage and the other device adapted to cause the carriage to move the latter until detached therefrom, detachable connections between the reciprocating driving means and the carriage, so arranged that the carriage will be connected with the driving means during only a part of each of its reciprocating movements, whereby the carriage will move only a portion of each reciprocating movement of the driving means, and the carriage will during its movement move the starting device and the other device while connected therewith.

40. The combination of elapsed time indicating mechanism a device for placing a time mark on a card, reciprocating driving means, a reciprocating carriage, detachable connections between said carriage and the time marking device adapted to cause the carriage to move the latter device until detached therefrom, and detachable connections between the driving means and the carriage, so arranged that the carriage will be connected with and driven by the driving means during only a part of each of its reciprocating movements, and while thus connected the carriage will move the time marking device until detached therefrom.

41. The combination of elapsed time indicating mechanism, a device adapted to be actuated by a mark, representing the time of a starting or first operation, to affect the extent of movement of the indicating mechanism, reciprocating driving means, a reciprocating carriage, detachable connections between the carriage and the mark-actuated device adapted to cause the carriage to move the latter until detached therefrom, detachable connections between the driving means and the carriage, so arranged as to cause the carriage to move only a part of each of the reciprocating movements of the driving means, whereby the carriage will move only a part of each reciprocating movement of the driving means, and will move the mark-actuated device as long as the latter is connected with it.

42. The combination of elapsed time indicating mechanism, a reciprocating carriage for actuating the same, reciprocating driving means, and detachable connections between the driving means and the carriage, so arranged that the carriage will be connected with and driven by the driving means during only a part of each of its reciprocating movements.

43. The combination of elapsed time indicating mechanism, a card, a device for placing a mark on the card representing the time of an operation, a device adapted to be actuated thereby to affect the extent of operation of the indicating mechanism, a reciprocating carriage for actuating both the marking device and the other device, and detachable connections between the carriage and each of said devices.

44. The combination of elapsed time indicating mechanism, a card, a device for placing a time mark on the card, a device adapted to be actuated by such mark to affect the extent of movement of the indicating mechanism, a common carriage for actuating both the marking device and the card-controlled device, a detachable connection between the carriage and the marking device adapted to be controlled by a clock stop, and a detachable connection between the carriage and the card-controlled device adapted to be controlled by the time mark on the card.

45. In an elapsed time indicating machine, the combination of a card, a device adapted to be actuated by a time mark on the card, a reciprocating carriage for moving the said device, and a detachable connection between the two adapted to be controlled by the said mark on the card.

46. In an elapsed time indicating machine, the combination of a reciprocating carriage for actuating the indicating mechanism, a driving part having a fixed reciprocating travel, an intermediate driving part between the said driving part and the carriage for communicating movement from the former to the latter, detachable connections between the two driving parts whereby the one will pick up the other and move it through a portion of its travel and release it and pick it up and return it to its original position and release it, means for rigidly locking the driving parts together during their connection, fixed stops for operating the detachable connection at each limit of travel of the intermediate driving part, and means for locking the carriage at each limit of its travel.

47. In an elapsed time indicating machine, the combination of a punch for punching a time mark in a card, a reciprocating carriage, a latch adapted to connect the punch with the carriage to transmit motion from the latter to the former, a projection for releasing the latch adapted to be operated by a time stop, time stops controlled by clock mechanism and adapted to be moved into the path of the projection, a clock mechanism, and a lock for holding the punch in fixed position when released from the carriage.

48. In an elapsed time indicating machine, the combination of a punch for punching a time mark in a card, a reciprocating carriage, a latch adapted to connect the punch with the carriage to transmit motion from the latter to the former, a projection for releasing the latch adapted to be operated by a time stop, time stops controlled by clock mechanism and adapted to be moved into the path of the projection, a clock mechanism, a lock for holding the punch in fixed position when released from the carriage, and means for enabling the carriage on its return movement to unlock the punch and return it to its original position.

49. In an elapsed time indicating machine, the combination of a punch for punching a time mark in a card, a reciprocating carriage, a latch adapted to connect the punch with the carriage to transmit motion from the latter to the former, a projection for releasing the latch adapted to be operated by a time stop, time stops controlled by clock mechanism and adapted to be moved into the path of the projection, a clock mechanism, a lock for holding the punch in fixed position when released from the carriage, and a secondary lock for keeping the first lock in locking position.

50. In an elapsed time indicating machine, the combination of two punches for punching time marks in a card, a common reciprocating carriage for moving both punches over the card, a latch for connecting each punch with the carriage, a projection for each punch adapted to release the latch upon engagement with a time stop, a clock mechanism, and a set of time stops for each punch controlled by the clock mechanism and movable into the path of the projection.

51. In an elapsed time indicating machine, the combination of a punch for punching a time mark on a card, means for moving it back and forth over the card, a lock for holding it in punching position and a secondary lock for keeping the first lock in operative position.

52. In an elapsed time indicating machine, the combination of a punch, means for moving it back and forth over a card, a locking rack for locking the punch in its operative position and means for connecting the punch with the rack and disconnecting it therefrom.

53. In an elapsed time indicating machine, the combination of two punches, each separately mounted and free to reciprocate on a separate bar, a common carriage for moving the punches back and forth along the bars and a locking and guiding rack for each punch.

54. In an elapsed time indicating machine, the combination of a punch for making time marks on a card, consisting of a supporting part free to reciprocate over the card, a punching part connected therewith and movable thereon and provided with an opening and an irregular shaped rod passing through said opening and adapted to be rocked so as to make contact with the walls of the opening and move the punching part to cause it to make a mark in the card.

55. In an elapsed time indicating machine, the combination of a punch having a supporting portion free to reciprocate, a punching part connected therewith and movable thereon and provided with an opening, an irregular shaped rod passing through said opening but normally not in contact with its walls, and means for rocking said rod to cause it to contact with the walls of the opening and to move the punching part to make a mark in the card, whereby the punch may be reciprocated back and forth along said rod without friction and may be operated at the proper time.

56. In an elapsed time indicating machine, the combination of a punch having a supporting portion free to reciprocate, a punching part connected therewith and movable thereon and provided with an opening, an irregular shaped rod passing through said opening but normally not in contact with its walls, and means for rocking said rod to cause it to contact with the walls of the opening and to move the punching part to make a mark in the card, and to positively withdraw the punch from the card, whereby the punch may be moved along the rod freely and without friction and may be operated positively at the proper moment and be positively withdrawn from the card.

57. In an elapsed time indicating machine, a punch provided with a pin point for making a small time hole in a card.

58. In an elapsed time indicating machine, the combination of two punches for punching time marks in a card, a common reciprocating carriage for moving both punches back and forth over the card, and separate means for operating each punch.

59. In an elapsed time indicating machine, the combination of a device for placing time marks upon a card, means for moving it across the card, a clock movement and a cylinder driven by the clock movement and provided with pins spirally arranged corresponding to the subdivisions of time, whereby at each division of time the appropriate pin will be brought into the path of the said device to stop its movement and whereby the extent of movement of the said device is made dependent upon the time of the operation of the machine.

60. In an elapsed time indicating machine, a stop device for limiting the extent of movement of the indicating mechanism consisting of pins, representing different subdivisions of time, adapted to be brought into contact with the card, whereby any pin will pass through any starting time hole therein registering therewith.

61. In an elapsed time indicating machine, the combination of a card, a stop device for limiting the extent of movement of the indicating mechanism consisting of pins, representing different subdivisions of time, adapted to be brought into contact with the card, whereby any pins will pass through any time hole therein registering therewith and will project into the path of movement of a device for affecting the movement of the indicating mechanism, and a device adapted to strike and be stopped by any pin projecting through a hole and thereby affect the extent of movement of the elapsed time indicating mechanism.

62. In an elapsed time indicating machine, a card, a stop device for limiting the extent of movement of the indicating mechanism consisting of pins, representing different subdivisions of time, adapted to be brought into contact with the card whereby any pin will pass through any time hole therein registering therewith, and means for causing the card and pins to accurately register with each other, whereby each pin, where it projects through the card, will accurately limit the extent of movement of the indicating mechanism in accordance with the time which the pin represents.

63. In an elapsed time indicating mechanism, the combination of a pin box, a series of pins arranged therein and representing different subdivisions of time, means for moving the pin box to bring the pins into engagement with a card and causing a pin to pass through the card and project beyond it whenever in line with a hole in the card, and permitting the other pins to rest upon the surface of the card.

64. In an elapsed time indicating mechanism, the combination of a stop device for limiting the extent of movement of the elapsed time indicating mechanism consisting of a pin box, a series of pins arranged therein and representing different subdivisions of time, means for moving the pin box to bring the pins into engagement with a card and cause a pin to pass through the card and project beyond it whenever in line with a hole in the card, and means for permitting the other pins to rest upon the surface of the card.

65. In an elapsed time indicating machine, the combination of a device consisting of a punch provided with a pin point for punching small holes in a card representing the time of such operation, a stop device for limiting the extent of movement of the indicating mechanism consisting of pins, representing different subdivisions of time, means for bringing the pins into contact with the card, means for causing the card to accurately register with the pins, and a device adapted to make contact with any pin projecting through a hole previously punched in the card to affect the indicating operation of the elapsed time indicating mechanism.

66. In an elapsed time indicating machine, the combination of elapsed time recording mechanism for placing a time mark upon a card representing the time of the first or "in" operation, and giving an indication of elapsed time between two operations of the machine, printing devices for printing the data of the second or "out" operation of the machine, and means for preventing such devices from printing when a card without any starting time mark upon it is inserted in the machine.

67. In an elapsed time indicating machine, the combination of printing devices for printing the data of the second or "out" operation of the machine, a slide carrying a printing pad therefor, projections on said slide, a device adapted to strike one of such projections at the farthest limit of its permissible travel in one direction to move the slide so as to carry the printing pad out of operative position, and on its return movement to strike the other projection to return the slide and pad to their normal positions.

68. The combination of elapsed time indicating mechanism composed of a higher and a lower denomination, means for indicating upon the indicating mechanism of each denomination the difference of time in its denomination between two operations, and means, controlled by the mechanism of the lower denomination, for subtracting a unit from the indicating mechanism of the higher denomination.

69. The combination of elapsed time indicating mechanism composed of a higher and a lower denomination, means for indicating upon the indicating mechanism of each denomination the difference of time in its denomination between two operations of the machine, a device for moving the indicating mechanism of the higher denomination backward one point to subtract one unit from its indication, a shield for normally preventing the operation of such subtracting device, and means controlled by the indicating mechanism of the lower denomination for removing the shield from its protective position to enable the subtracting device to subtract one from the higher denomination.

70. The combination of a clock movement, elapsed time indicating mechanism, composed of a higher and a lower denomination, normally connected to and driven by the clock movement, means for moving the indicating mechanism in the reverse direction to indicate elapsed time between two operations of the machine, means for disconnecting the indicating mechanism from the clock movement and connecting it with the reverse movement means, a device for subtracting a unit from the indicating mechanism of the higher order, adapted to be controlled by but normally out of operative connection with the mechanism of the lower order, and means for bringing the two into operative connection at the time when the indicating mechanism is disconnected from the clock movement and connected with the reverse movement means, whereby the indicating mechanism will normally be driven by the clock without interference from the subtracting mechanism, and the subtracting device will be in operative position only during the reverse movement of the indicating mechanism.

71. In a subtractor mechanism of an elapsed time indicating machine, the combination of means for subtracting one from the indicating means of a higher denomination, a projection from the mechanism connected with the indicating mechanism of a lower order normally out of the path of the subtracting mechanism, and means for throwing it into the path thereof in order to subtract one from the indicating mechanism of a higher order.

72. The combination of a clock movement, elapsed time indicating mechanism of a higher and lower denomination set normally one unit in advance of the true time and driven normally by the clock movement, means for moving the indicating mechanism in the reverse direction one unit more than the difference in time between two operations of the machine, subtracting devices controlled by the indicating mechanism of the lower denomination for subtracting one from the indicating mechanism of the higher denomination, and a lock for rendering such subtracting devices inoperative during the first step or unit of such reverse movement.

73. In an elapsed time recording machine adapted to make a record upon removable cards of the elapsed time between two operations of the machine, the combination of elapsed time type wheels, a card adapted to be inserted into and removed from the machine, means for moving the elapsed time type wheels to cause them to indicate the elapsed time between two operations of the machine, hour and minute type wheels for printing the time of the first or "in" operation of the machine, hour and minute type wheels for printing the time of the second or "out" operation of the machine, printing devices for each of said sets of type wheels, and means for rendering operative one or more of such printing devices and rendering inoperative the remainder whereby at the first operation the "in" time will alone be printed upon the card and at the second operation the elapsed time between it and the second operation, together with the time of the second operation, will be printed upon the card.

74. In a time indicating machine, the combination of a minute time type wheel, an hour time type wheel driven by the minute wheel, means for alining the minute wheel and means for preventing backward movement of the minute wheel when released from the alining device.

75. The combination of elapsed time indicating mechanism, clock-controlled means for moving it one way in accordance with time, a time device representing the time of a first operation, and a device adapted to contact with the time device to limit the movement of the elapsed time indicating mechanism in the reverse way in accordance with the time of said first operation.

76. The combination of elapsed time indicating mechanism, a selecting block adapted to be connected therewith and to move the same, a carriage for moving the selecting block back and forth, a latch for connecting the two together, and a device representing the time of a first or starting operation adapted to operate the latch to release the block from the carriage to limit the extent of movement of the indicating mechanism.

77. The combination of elapsed time indicating mechanism, a time stop consisting of pins adapted to be brought into contact with a card, each pin adapted to enter any registering hole therein and project through the card and card receiver, a card receiver, a selecting block adapted to be connected with and to move the indicating mechanism, a carriage for moving the selecting block, a latch for connecting the two together, a projection from the block adapted to make contact with any pin projecting from the card receiver to operate the latch and release the block from the carriage, whereby the extent of movement of the indicating mechanism will depend upon the particular hole in the card through which a pin projects.

78. The combination of elapsed time indicating mechanism composed of a higher and a lower denomination, a clock movement, mechanism driven thereby for affecting the indicating mechanism of the lower denomination, driving mechanism for affecting the indicating mechanism of the higher denomination, a motor for such driving mechanism, and an escapement device, controlled by the clock driven mechanism for controlling the driving mechanism for affecting the indicating mechanism of the higher denomination.

79. The combination of elapsed time indicating mechanism clock-controlled one way normally so as to indicate true time, and means for moving it the reverse way in accordance with a prior time to cause it to indicate elapsed time.

80. In an elapsed time indicating mechanism, a stop device consisting of a series of stops representing different subdivisions of time and adapted to be brought into contact with a card and to be moved into operative stopping position by marks upon the card.

81. In an elapsed time indicating mechanism, the combination of a stop device consisting of a series of stops and means for bringing the stops into contact with a card and causing any stop registering with a hole in the card to pass through the hole and project beyond the card and causing the other stops to rest upon the surface of the card.

82. In an elapsed time indicating machine, the combination of a time indicating device, another time indicating device of a higher denomination driven by the time device of the lower denomination, means for alining the device of lower denomination, and means for preventing its backward movement when released from the alining device.

83. The combination of elapsed time indicating mechanism, a clock-controlled device for moving it one way, and means for moving it the reverse way in accordance with the time of a prior operation.

84. The combination of elapsed time indicating mechanism, a clock-controlled device for moving it one way, means controlled by a time mark on a card, representing the time of a prior operation, for moving it the reverse way in accordance with such time mark, and a card provided with such a time mark.

85. The combination of elapsed time recording mechanism, clock-controlled means for driving the same, and means for releasing the elapsed time recording mechanism from the clock-controlled means and moving it reversely in accordance with a prior time.

86. The combination of elapsed time indicating mechanism, a clock-controlled device for operating it in accordance with the true time, and a card provided with a mark representing the time of a prior operation adapted to subtract such prior time from the time indication of the elapsed time indicating mechanism to cause it to indicate the elapsed time between such operations.

87. In an elapsed time recording machine, the combination of a separate recording device for recording the time of a first or "in" operation, a separate recording device for recording the time of a second or "out" operation, and a separate elapsed time recording device for recording the elapsed time between the said two operations and means for operating one or more of said recording devices without the other or others.

88. In an elapsed time recording machine, the combination of a separate recording device for recording the time of a first or "in" operation, a separate recording device for recording the time of a second or "out" operation, a separate elapsed time recording device for recording the elapsed time between the said two operations and means for operating one or more of said recording devices without the other or others, and clock-controlled means for normally driving all of said recording devices.

89. In an elapsed time recording machine, the combination of a separate recording device for recording the time of a first or "in" operation, a separate recording device for recording the time of a second or "out" operation, a separate elapsed time recording device for recording the elapsed time between the said two operations, clock-controlled means for normally driving all of said recording devices and means for operating one or more of said recording devices without the other or others, and means for disconnecting the elapsed time recording device from the clock-controlled means and moving it in accordance with the time of the first operation to cause it to record the elapsed time between the said two operations.

90. In an elapsed time recording machine, the combination of a separate recording device for recording the time of a first or "in" operation, a separate recording device for recording the time of a second or "out" operation, a separate elapsed time recording device for recording the elapsed time between the said two operations, clock-controlled means for normally driving all of said recording devices and means for operating one or more of said recording devices without the other or others, means for disconnecting the elapsed time recording device from the clock-controlled means and moving it in a reverse direction, and means for limiting such reverse movement in accordance with the time of the first operation.

91. The combination of elapsed time indicating mechanism having variable limits in its elapsed time indicating operation, clock-controlled means for normally moving it one way in its said operation, and means controlled by the time of a prior operation for moving it the reverse way in its said operation.

92. The combination of elapsed time indicating mechanism having variable limits to its elapsed time indicating operation, clock-controlled means for normally moving it one way in its said operation in accordance with the true time, and means for subtracting from its condition at any time in accordance with the time of a prior operation.

93. The combination of elapsed time indicating mechanism, clock-controlled means for normally moving it in its elapsed time indicating operation in accordance with the true time, and a card provided with a time mark representing the time of a prior operation adapted to subtract in the said elapsed time indicating operation the time of the prior operation to cause the indicating mechanism to indicate the elapsed time between two operations.

94. The combination of a clock movement and elapsed time indicating mechanism controlled thereby to indicate in a first operation the true time of such operation and in a second operation by the same operator to operate reversely so as to subtract from the time of such second operation the time of the first operation and indicate the elapsed time between the two operations.

95. Clock-actuated calculating mechanism adapted to record amounts upon a card, and means controlled by said records for subtracting the amount represented by each record from an amount represented by the advance of the clock and recording the difference.

In testimony whereof, I have signed my name to this specification, in the presence of two subscribing witnesses.

JAMES W. BRYCE.

Witnesses:
EDWIN SEGER,
JOHN O. GEMPLER.